(12) United States Patent
Kim

(10) Patent No.: US 10,546,093 B2
(45) Date of Patent: Jan. 28, 2020

(54) COMPUTER-IMPLEMENTED METHOD AND COMPUTING SYSTEM FOR DESIGNING INTEGRATED CIRCUIT BY CONSIDERING PROCESS VARIATIONS OF WIRE

(71) Applicant: SAMSUNG ELECTRONICS CO., LTD., Suwon-si, Gyeonggi-Do (KR)

(72) Inventor: Moon-Su Kim, Gimpo-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 81 days.

(21) Appl. No.: 15/867,470

(22) Filed: Jan. 10, 2018

(65) Prior Publication Data
US 2018/0365364 A1 Dec. 20, 2018

(30) Foreign Application Priority Data
Jun. 15, 2017 (KR) .................. 10-2017-0076012

(51) Int. Cl.
*G06F 17/50* (2006.01)
*G03F 1/70* (2012.01)
*G03F 1/36* (2012.01)

(52) U.S. Cl.
CPC ........... *G06F 17/5072* (2013.01); *G03F 1/36* (2013.01); *G03F 1/70* (2013.01); *G06F 17/5045* (2013.01); *G06F 17/5081* (2013.01); *G06F 2217/02* (2013.01); *G06F 2217/84* (2013.01)

(58) Field of Classification Search
CPC ........... G06F 17/5072; G06F 17/5045; G06F 17/5081; G06F 2217/02; G06F 2217/84

USPC ............ 716/108, 113, 134, 136, 53, 54, 55; 703/16

See application file for complete search history.

(56) References Cited

U.S. PATENT DOCUMENTS

| | | | |
|---|---|---|---|
| 6,018,623 A | 1/2000 | Chang et al. | |
| 7,293,248 B2 | 11/2007 | Chang et al. | |
| 7,346,874 B1 | 3/2008 | Burks | |
| 7,689,954 B2 | 3/2010 | Zhang et al. | |
| 7,853,911 B1 * | 12/2010 | Fung ................. | G06F 17/5054 716/113 |

(Continued)

OTHER PUBLICATIONS

Tuck-Boon Chan, et al., "Improved Signoff Methology With Tightened Beol Corners," Computer Design (ICCD), 2014 32nd IEEE International Conference, pp. 311-316.

(Continued)

*Primary Examiner* — Phallaka Kik
(74) *Attorney, Agent, or Firm* — F. Chau & Associates, LLC

(57) ABSTRACT

A computer-implemented method and a computing system for designing an integrated circuit are provided. The computer-implemented method of designing an integrated circuit includes receiving layout data for the integrated circuit and a technology file that includes corners of a parasitic component of each of a plurality of layers included in the integrated circuit, generating parasitic component data by performing a parasitic component extraction operation on corners of a parasitic component of a layer in a timing arc on a net of the integrated circuit, the parasitic component data including delay variation data of the timing arc, and generating timing analysis data by performing a timing analysis on the integrated circuit, based on the parasitic component data.

19 Claims, 17 Drawing Sheets

- Characterize wire delay sensitivity coefficient
  - For each net timing arc
  - For each layer (L1, L2, ..., Li, ...)
  - For each corner (C1, C2, ..., Cj), C0 is nominal corner
  - Wire delay sensitivity coefficient for layer i and corner j $$S_{ij} = \alpha * \frac{\Delta W_{d\_ij}}{W_{d\_nom}} = \alpha * \frac{W_{d\_ij} - W_{d\_nom}}{W_{d\_nom}}$$

$$= \alpha * \frac{W_d(L1@C0, L2@C0, ..., Li@Cj, ...) - W_d(L1@C0, L2@C0, ..., Li@C0, ...)}{W_d(L1@C0, L2@C0, ..., Li@C0, ...)}$$

(56) References Cited

U.S. PATENT DOCUMENTS

| | | |
|---|---|---|
| 8,015,525 B2 | 9/2011 | Chang et al. |
| 8,151,229 B1 | 4/2012 | Chang et al. |
| 8,160,858 B2 | 4/2012 | Tseng et al. |
| 8,302,047 B2 | 10/2012 | Buss et al. |
| 8,504,956 B1* | 8/2013 | Shebaita ............. G06F 17/5031 703/19 |
| 8,555,222 B2 | 10/2013 | Le et al. |
| 8,799,839 B1* | 8/2014 | Tetelbaum .......... G06F 17/5031 716/108 |
| 9,483,604 B1* | 11/2016 | Foreman ............. G06F 17/5081 |
| 9,519,747 B1* | 12/2016 | Buck ................... G06F 17/5081 |
| 10,318,676 B2* | 6/2019 | Yeung ................. G06F 17/5031 |
| 10,318,696 B1* | 6/2019 | Yeung ................. G06F 17/5081 |
| 10,346,569 B2* | 7/2019 | Allen .................. G06F 17/5022 |
| 10,372,869 B2* | 8/2019 | Kim .................... G06F 17/5081 |
| 10,394,999 B2* | 8/2019 | Kurtz .................. G06F 17/5036 |
| 2004/0078765 A1* | 4/2004 | Cui ..................... G06F 17/5022 716/113 |
| 2009/0249272 A1 | 10/2009 | Yoda |
| 2009/0327989 A1* | 12/2009 | Zhuoxiang .......... G06F 17/5081 716/126 |
| 2011/0055793 A1* | 3/2011 | Buck ................... G06F 17/5031 716/136 |
| 2011/0078642 A1* | 3/2011 | Elfadel ............... G06F 17/5036 716/106 |
| 2013/0018617 A1* | 1/2013 | Buck ................... G06F 17/5036 702/81 |
| 2013/0091480 A1* | 4/2013 | Horlacher ........... G06F 17/5081 716/113 |
| 2016/0180008 A1* | 6/2016 | Liu ..................... G06F 17/5081 716/115 |
| 2016/0216316 A1 | 7/2016 | Kim |
| 2016/0283643 A1* | 9/2016 | Kim .................... G06F 17/5081 |
| 2017/0017743 A1 | 1/2017 | Hu et al. |
| 2017/0122998 A1* | 5/2017 | Liu ..................... G06F 17/5031 |
| 2018/0210987 A1* | 7/2018 | Yeung ................. G06F 17/5031 |
| 2018/0365360 A1* | 12/2018 | Foreman ............. G06F 17/5036 |
| 2019/0258775 A1* | 8/2019 | Kim ....................... G06F 17/505 |

OTHER PUBLICATIONS

David Blaauw, et al., "Statistical Timing Analysis: From Basic Principles to State of the Art," IEEE Transactions on Computer-Aided Design of Integrated Circuits and Systems, vol. 27, No. 4, Apr. 2008, pp. 589-607.

* cited by examiner

FIG. 9

- Characterize wire delay sensitivity coefficient
  - For each net timing arc
  - For each layer (L1, L2, ..., Li, ...)
  - For each corner (C1, C2, ..., Cj), C0 is nominal corner
  - Wire delay sensitivity coefficient for layer i and corner j $$s_{ij} = \alpha * \frac{\Delta W_{d\_ij}}{W_{d\_nom}} = \alpha * \frac{W_{d\_ij} - W_{d\_nom}}{W_{d\_nom}}$$

$$= \alpha * \frac{W_d(L1@C0, L2@C0, ..., Li@Cj, ...) - W_d(L1@C0, L2@C0, ..., Li@C0, ...)}{W_d(L1@C0, L2@C0, ..., Li@C0, ...)}$$

FIG. 10A

| NODE | LAYER | RES@C0 | RES@Cj | CAP@C0 | CAP@Cj |
|------|-------|--------|--------|--------|--------|
| N1 | M1 | r1 (ex. 1) | r1' (ex. 2) | c1 (ex. 2) | c1' (ex. 1) |
| N2 | M2 | r2 (ex. 2) | r2' (ex. 3) | c2 (ex. 2) | c2' (ex. 1.5) |
| N3 | M1 | r3 (ex. 1) | r3' (ex. 2) | c3 (ex. 2) | c3' (ex. 1) |
| N4 | M2 | r4 (ex. 1) | r4' (ex. 3) | c4 (ex. 2) | c4' (ex. 1) |

FIG. 10B

| | $W_{d\_nom}$ | $W_{d\_j}$ | $\Delta W_{d\_j}$ | $s_{ij}$ |
|---|---|---|---|---|
| M1 | r1(c1+c2+c3+c4) + r2(c2+c3) + r3(c3) | r1'(c1'+c2+c3'+c4) + r2(c2+c3') + r3'(c3') | 2 | 2/18 |
| M2 | | r1(c1+c2'+c3+c4') + r2'(c2'+c3) + r3(c3) | 1 | 1/18 |

- Extend to cell delay variation induced by wire
  - Total capacitance coefficient for layer layer i and corner j $$cs_{ij} = \alpha * \frac{\Delta C_{total\_ij}}{C_{total\_nom}} = \alpha * \frac{C_{total\_ij} - C_{total\_nom}}{C_{total\_nom}}$$

$$= \alpha * \frac{C_{total}(L1@C0, L2@C0, ..., Li@Cj, ...) - C_{total}(L1@C0, L2@C0, ..., Li@C0, ...)}{C_{total}(L1@C0, L2@C0, ..., Li@C0, ...)}$$

FIG. 17

|  | M1 | | M2 | |
| --- | --- | --- | --- | --- |
|  | C1 | C2 | C1 | C2 |
| $C_{d\_nom}$ | 10 | | | |
| $cs_{ij}$ | 0.3 | −0.3 | 0.1 | −0.1 |
| CELL DELAY SENSITIVITY | 3 | −3 | 1 | −1 |
| $W_{d\_nom}$ for ARC1 | 5 | | | |
| $s_{ij}$ for ARC1 | 0.2 | −0.2 | −0.1 | 0.5 |
| WIRE DELAY SENSITIVITY FOR ARC1 | 1 | −1 | −0.5 | 2.5 |
| TOTAL IMPACT | 4 | −4 | 0.5 | 1.5 |
| WORST CORNER | C1 | | C2 | |
| STATISTICAL WORST SENSITIVITY | $4.3 = \sqrt{4^2 + 1.5^2}$ | | | |

CELL DELAY SENSITIVITY = $C_{d\_nom} * cs_{ij}$
WIRE DELAY SENSITIVITY = $W_{d\_nom} * s_{ij}$

COMPUTER-IMPLEMENTED METHOD AND COMPUTING SYSTEM FOR DESIGNING INTEGRATED CIRCUIT BY CONSIDERING PROCESS VARIATIONS OF WIRE

CROSS-REFERENCE TO RELATED APPLICATION

This application claims priority under 35 U.S.C. § 119 from, and the benefit of, Korean Patent Application No. 10-2017-0076012, filed on Jun. 15, 2017 in the Korean Intellectual Property Office, the contents of which are herein incorporated by reference in their entirety.

BACKGROUND

Embodiments of the inventive concept are directed to an integrated circuit, and more particularly, to a computer-implemented method and a computing system for designing an integrated circuit by considering process variations of wires.

An integrated circuit can be designed based on standard cells. Specifically, a layout of an integrated circuit may be generated by placing standard cells that define the integrated circuit and routing the placed standard cells. As a semiconductor device is miniaturized, the size of patterns included in a layout gradually decreases, and accordingly, minute differences between the size of a designed pattern and the size of a pattern implemented by hardware causes degradation in yield of the integrated circuit. Wire process variations include resistance/capacitance variations in metal layers or vias. When the resistance of a metal layer is greater than a nominal value, a clock delay may increase, and accordingly, timing violations can occur. A conventional parasitic component description file includes resistance sensitivity and capacitance sensitivity for each node. As a result, the size of the parasitic component description file is very large, and in a timing analysis operation, the complexity of and time required for a calculation can greatly increase. In particular, due to wire process variations corresponding to a back-end-of-line (BEOL), a delay through a timing path that includes the wire can increase, and thus, a timing constraint violation may occur in the timing path.

SUMMARY

According to an embodiment of the inventive concept, there is provided a computer-implemented method of designing an integrated circuit, the computer-implemented method including: receiving layout data for the integrated circuit and a technology file that includes corners of a parasitic component of each of a plurality of layers included in the integrated circuit; generating parasitic component data by performing a parasitic component extraction operation on corners of a parasitic component of a layer in a timing arc on a net of the integrated circuit, the parasitic component data including delay variation data of the timing arc due to a process variation of the layer; and generating timing analysis data by performing a timing analysis on the integrated circuit based on the parasitic component data.

According to another embodiment of the inventive concept, there is provided a method of manufacturing an integrated circuit, the method including: generating parasitic component data by performing a parasitic component extraction operation on corners of parasitic components of a layer in a timing arc on a net of the integrated circuit using layout data for the integrated circuit and a technology file that includes corners of a parasitic component of each layer in the integrated circuit, wherein the parasitic component data includes delay variation data of the timing arc due to a process variation of the layer of the timing arc; generating timing analysis data by performing a timing analysis on the integrated circuit based on the parasitic component data; and manufacturing the integrated circuit based on the layout data and the timing analysis data.

According to another embodiment of the inventive concept, there is provided a computing system for designing an integrated circuit, the computing system including: a memory that stores procedures that design the integrated circuit; and a processor connected to the memory and that execute the procedures, wherein a net of the integrated circuit corresponds to a plurality of timing arcs and each of the plurality of timing arcs includes a plurality of layers, wherein the procedures include: a parasitic component extractor that generates parasitic component data by performing a parasitic component extraction operation on each corner of an i-th layer for each timing arc, the parasitic component data including a wire delay sensitivity coefficient when parasitic components of the i-th layer are shifted to a j-th corner, where i and j are natural numbers; and a timing analyzer that generates timing analysis data by performing a timing analysis on the integrated circuit, based on the parasitic component data.

BRIEF DESCRIPTION OF THE DRAWINGS

FIG. 9 illustrates an operation of characterizing a wire delay sensitivity coefficient, according to an embodiment.

FIGS. 10A and 10B illustrate an operation of characterizing a wire delay sensitivity coefficient in FIG. 9.

FIG. 17 illustrates an example of a timing analysis method of FIG. 16.

DETAILED DESCRIPTION OF THE EMBODIMENTS

Figure 1:
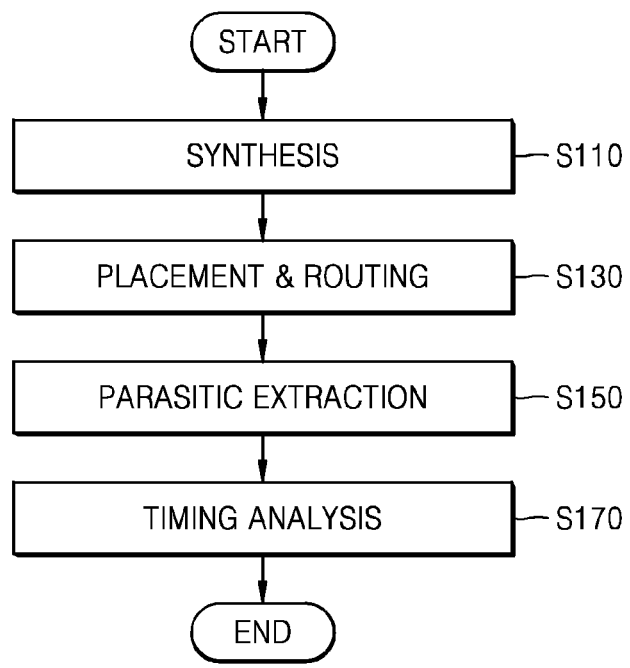
FIG. 1 is a flowchart of a method of designing an integrated circuit, according to an embodiment.

FIG. 1 is a flowchart of a method of designing an integrated circuit, according to an embodiment.

Referring to FIG. 1, to design an integrated circuit layout, a method of method of designing an integrated circuit can be performed using a tool for designing the integrated circuit. In this case, according to an embodiment, the tool for designing the integrated circuit is a program that includes a plurality of instructions performed by a processor. Accordingly, the method of designing an integrated circuit can be referred to as a computer-implemented method of designing an integrated circuit.

According to an embodiment, in operation S110, a synthesis operation is performed. For example, operation S110 is performed by the processor using a synthesis tool. Specifically, a netlist of gate levels is generated by synthesizing input data, defined in a register transfer language (RTL), with respect to an integrated circuit by using a standard cell library.

According to an embodiment, in operation S130, layout data, hereinafter referred to as "layout data", for the integrated circuit is generated by placing and routing, hereinafter referred to as "P&R", standard cells that define the integrated circuit based on the netlist. For example, operation S130 is performed by a processor using a P&R tool. For example, the layout data can be graphic design system (GDS) II format data.

According to an embodiment, in operation S150, a parasitic component description file is generated by extracting parasitic components from the layout data. For example, operation S150 is performed by a processor using a parasitic extraction (PEX) tool. Parasitic components are extracted for a plurality of corners of a layer included in a timing arc on a net included in the layout data. Hereinbelow, the term "layer" corresponds to a wire, and may refer to a metal layer or a via. The parasitic component description file is generated as a standard parasitic extraction format (SPEF) file. The layout data is provided as an input file to the PEX tool, and the SPEF file is output as an output file from the P&R tool. Operation S150 will be described in more detail with reference to FIGS. 2 to 13.

According to an embodiment, in operation S170, timing analysis data is generated by performing a timing analysis of the integrated circuit. For example, operation S170 is performed by the processor using a static timing analysis (STA) tool. The term "timing analysis" refers to an operation of determining whether timing paths included in the integrated circuit satisfy timing constraints and selecting from the timing paths a timing critical path in which the total timing delay from an input (i.e., a start point) to an output (i.e., an end point) exceeds timing requirements, according to the determination result. For example, the timing constraints include setup timing constraints and hold timing constraints. According to an embodiment, the parasitic component description file is provided as an input file to the STA tool, and the timing analysis data is output as an output file from the STA tool. Operation S170 will be described in more detail with reference to FIGS. 14 to 18.

In an embodiment, the design method further includes an operation of performing engineering change orders (ECO) based on the timing analysis data. The design method further includes an operation of performing clock tree synthesis (CTS) or optimizations included in a P&R operation using the timing analysis data. The design method further includes an operation of modifying metal routing included in the P&R operation using the timing analysis data. For example, based on the timing analysis data, the lengths of some wires are modified or the levels of some wires are modified into wires of another level.

Figure 2:
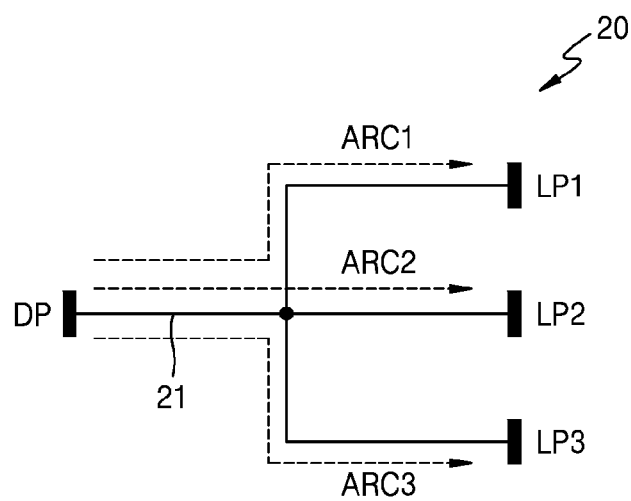
FIG. 2 illustrates an example of an integrated circuit according to an embodiment.

FIG. 2 illustrates an integrated circuit 20 according to an embodiment.

Referring to FIG. 2, according to an embodiment, the integrated circuit 20 includes a net 21. The net 21 represents an equipotential in an equivalent circuit diagram of the integrated circuit 20, and corresponds to an interconnection in a layout of the integrated circuit 20. The interconnection corresponds to a wiring structure that includes at least one metal layer electrically connected to at least one via. Hereinbelow, the term "layer" refers to a metal layer or a via included in the wiring structure. Hereinafter, the influence of a process variation of a wire will be described with a focus on a method of designing an integrated circuit by considering process variations of a metal layer. However, embodiments of the inventive concept are not limited thereto, and embodiments of the inventive concept may also include methods of designing an integrated circuit that consider process variations of a via.

According to an embodiment, net 21 corresponds to first to third timing arcs ARC1 to ARC3. The term "timing arc" refers to a path from a driving pin of net 21 to a loading pin of net 21. For example, the first timing arc ARC1 corresponds to a path from a driving pin DP to a first loading pin LP1, the second timing arc ARC2 corresponds to a path from the driving pin DP to a second loading pin LP2, and a third timing arc ARC3 corresponds to a path from the driving pin DP to a third loading pin LP3. As such, the number of timing arcs in net 21 corresponds to the number of loading pins.

Figure 3:
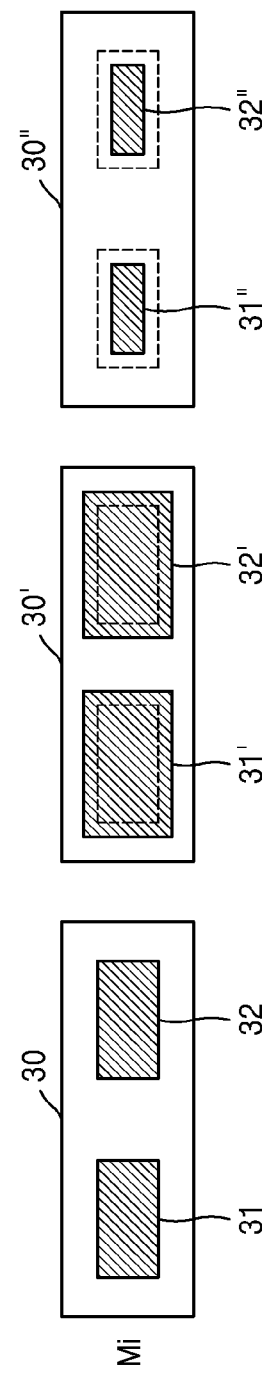
FIG. 3 illustrates a process variation of an i-th metal layer according to an embodiment.
Figure 4:
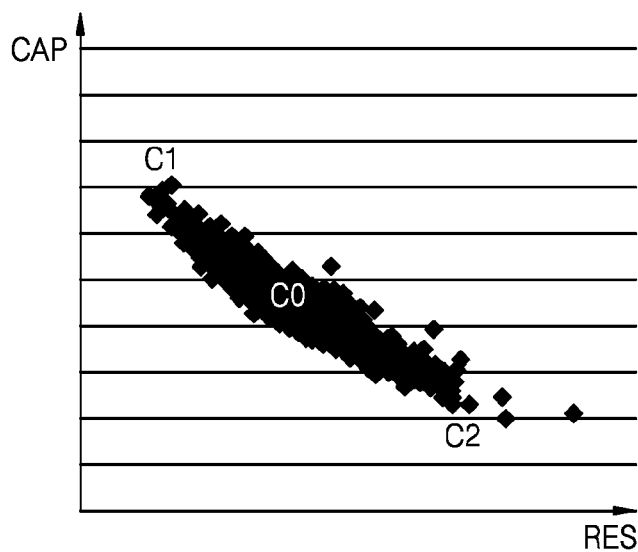
FIG. 4 is a graph of the distribution of parasitic resistance and parasitic capacitance of an i-th metal layer in FIG. 3.

FIG. 3 illustrates a process variation of an i-th metal layer Mi according to an embodiment, and FIG. 4 is a graph of the distribution of parasitic resistance and parasitic capacitance of an i-th metal layer Mi in FIG. 3. For example, FIG. 3 illustrates cross sections in a stacking direction of an integrated circuit.

Referring to FIGS. 3 and 4, according to an embodiment, an integrated circuit 30 includes first and second patterns 31 and 32, and the first and second patterns 31 and 32 are implemented with metal layers at the same level, for example, the i-th metal layer Mi, where i is a natural number. The first and second patterns 31 and 32 have sizes according to the layout data, and thus, the i-th metal layer Mi has a nominal resistance and a nominal capacitance. Hereinafter, when the i-th metal layer Mi has the nominal resistance and the nominal capacitance, the i-th metal layer Mi will be referred to as corresponding to a nominal corner C0.

According to an embodiment, integrated circuit 30' includes first and second patterns 31' and 32', and the first and second patterns 31' and 32' have sizes, such as heights, larger than sizes according to the layout data, due to process variations of the i-th metal layer Mi. A dotted line inside the integrated circuit 30' corresponds to the first and second patterns 31 and 32. Accordingly, the i-th metal layer Mi has a lower resistance than the nominal resistance and a higher capacitance than the nominal capacitance. Hereinafter, when the i-th metal layer Mi has minimum resistance and maximum capacitance, the i-th metal layer Mi will be referred to as corresponding to a first corner C1.

According to an embodiment, integrated circuit 30" includes first and second patterns 31" and 32", and the first and second patterns 31" and 32" have sizes, such as heights, smaller than sizes according to the layout data, due to process variations of the i-th metal layer Mi. A dotted line inside the integrated circuit 30" corresponds to the first and second patterns 31 and 32. Accordingly, the i-th metal layer Mi has a higher resistance higher than the nominal resistance and lower capacitance than the nominal capacitance. Hereinafter, when the i-th metal layer Mi has maximum resistance and minimum capacitance, the i-th metal layer Mi will be referred to as corresponding to a second corner C2.

Hereinafter, an embodiment in which a parasitic component extraction operation is performed on each of the first and second corners C1 and C2 of the i-th metal layer Mi will be described. In addition, an embodiment in which a timing analysis operation is performed on each of the first and second corners C1 and C2 of the i-th metal layer Mi will be described. However, embodiments of the inventive concept are not limited thereto, and the number of corners corresponding to the i-th metal layer Mi may vary according to other embodiments.

Figure 5:
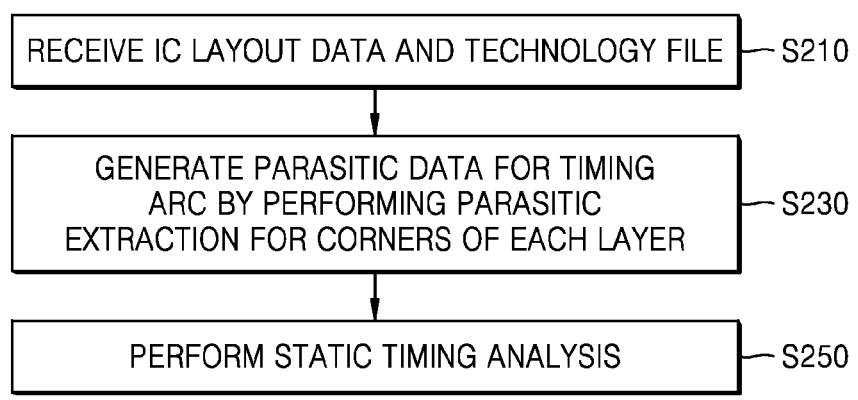
FIG. 5 is a flowchart of a method of designing an integrated circuit in more detail, according to an embodiment.

FIG. 5 is a flowchart of a method of designing an integrated circuit in more detail, according to an embodiment. Referring to FIG. 5, an integrated circuit design method according to a present embodiment is a method of extracting parasitic components from layout data and performing a timing analysis, and corresponds to, for example, operations S150 and S170 in FIG. 1. Thus, the description given above with reference to FIG. 1 can be applied to the present embodiment.

According to an embodiment, in operation S210, layout data and a technology file are received. The technology file includes information related to a process of manufacturing a semiconductor device that includes an integrated circuit. The technology file includes corners of a parasitic component of each layer. Specifically, the corners of the parasitic component include a plurality of corner values obtained from the distribution of parasitic resistance and parasitic capacitance. For example, the technology file includes parasitic resistance and parasitic capacitance at each of the nominal, first, and second corners C0, C1, and C2 of the i-th metal layer Mi in FIG. 4.

According to an embodiment, in operation S230, parasitic component data is generated by performing a parasitic component extraction operation on the corners of the parasitic component of each layer. The parasitic component data includes delay variation data of a timing arc. For example, the delay variation data may be wire delay sensitivity coefficients of the timing arc or a random wire delay sensitivity coefficient. The parasitic component data further includes delay variation data of a net. For example, the delay variation data may be capacitance sensitivity coefficients of the net or a random capacitance sensitivity coefficient. Operation S230 will be described in more detail with reference to FIGS. 6 to 13. In operation S250, a static timing analysis is performed based on the parasitic component data. Operation S250 will be described in more detail with reference to FIGS. 14 to 18.

Figure 6:
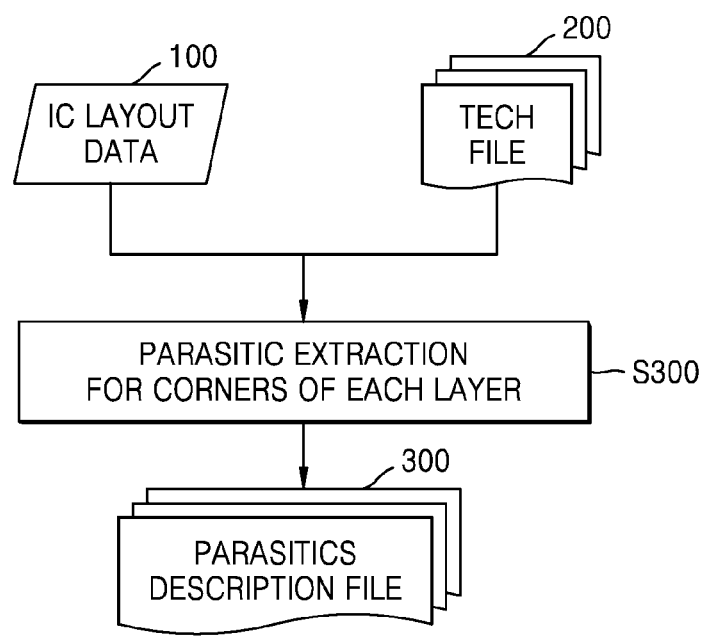
FIG. 6 is a flowchart of a method of extracting a parasitic component, according to an embodiment.

FIG. 6 is a flowchart of a method of extracting a parasitic component, according to an embodiment. Referring to FIG. 6, a parasitic component extraction method according to a present embodiment corresponds to, for example, operation S150 in FIG. 1 or operation S230 in FIG. 5. Thus, the descriptions given above with reference to FIGS. 1 to 5 apply to the present embodiment.

According to an embodiment, in operation S300, a plurality of parasitic component description files 300 are generated by performing a parasitic component extraction operation on corners of each layer included in a timing arc, based on layout data 100 and a technology file 200 received in operation S210 of FIG. 5. For example, a plurality of parasitic component description files 300 are generated for a plurality of nets, and correspond to parasitic component data described with reference to FIG. 5. Each of the parasitic component description files 300 includes parasitic component data for a net and parasitic component data for a timing arc that corresponds to a net.

In an embodiment, one net corresponds to a plurality of timing arcs, and a parasitic component extraction operation is performed on each of the plurality of timing arcs. One timing arc includes a plurality of layers, and a parasitic component extraction operation may be performed on each of the plurality of layers of the timing arc. Each of the parasitic component description files 300 includes delay variation data of a timing arc and delay variation data of a net due to process variations of a layer. The delay variation data may vary, according to embodiments.

In an embodiment, the delay variation data includes wire delay sensitivity coefficients. The wire delay sensitivity coefficients are obtained for each timing arc and correspond to a wire delay variations due to global variations. The global variation refers to an average variation of a chip due to variations between chips, a variation between wafers, or a variation between lots. Specifically, wire delay sensitivity coefficients are obtained for all layers and all corners included in a timing arc. In a timing analysis operation, by performing a timing analysis using the wire delay sensitivity coefficients, a wire delay sensitivity of the timing arc due to global process variations of a wire are calculated. Accordingly, a delay difference of a timing path based on the global variation may be obtained. This will be described below with reference to FIGS. 10A to 11.

In an embodiment, delay variation data includes wire delay sensitivity coefficients and capacitance sensitivity coefficients. The capacitance sensitivity coefficients are obtained for each net and correspond to cell delay variations due to global variations. Specifically, capacitance sensitivity coefficients are obtained for all layers and all corners included in a net. In a timing analysis operation, by performing a timing analysis using the wire delay sensitivity coefficients and the capacitance sensitivity coefficients, a cell/wire delay sensitivity that includes a wire delay sensitivity of a timing arc and a delay sensitivity of a cell due to global process variations of a wire are calculated. Accordingly, delay differences of a timing path according to global variations are obtained. This will be described below with reference to FIG. 12.

In an embodiment, delay variation data includes wire delay sensitivity coefficients, capacitance sensitivity coefficients, random wire delay sensitivity coefficients, and random capacitance sensitivity coefficients. The random wire delay sensitivity coefficients are obtained for each timing arc and correspond to wire delay variations due to a local random variation. The local random variations refer to variations inside a chip, such as variations between timing arcs or transistors in a chip. The random capacitance sensitivity coefficients are obtained for each net and correspond to cell delay variations caused by local random variations. In a timing analysis operation, by performing a timing analysis using the wire delay sensitivity coefficients, the capacitance sensitivity coefficients, the random wire delay sensitivity coefficients, and the random capacitance sensitivity coefficients, a total delay sensitivity that includes a wire delay sensitivity of a timing arc and a delay sensitivity of a cell due to global process variations of a wire and local random process variations are calculated. Accordingly, delay differences of a timing path based on the global variations and the local random variations may be obtained.

Figure 7A:
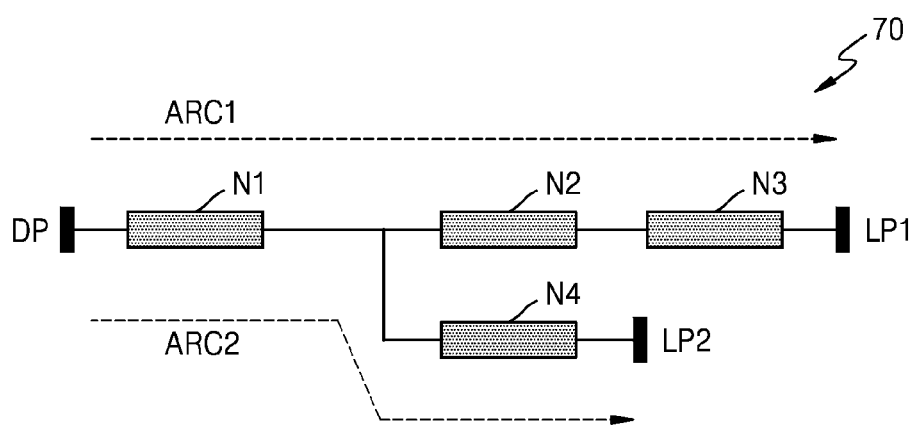
FIG. 7A illustrates an integrated circuit according to an embodiment.
Figure 7B:
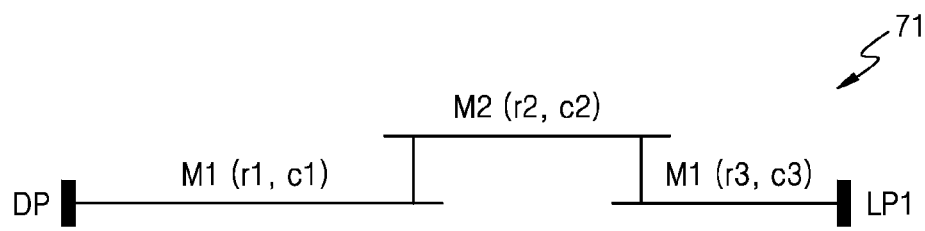
FIG. 7B illustrates a wiring structure of a first timing arc in FIG. 7A.
Figure 7C:
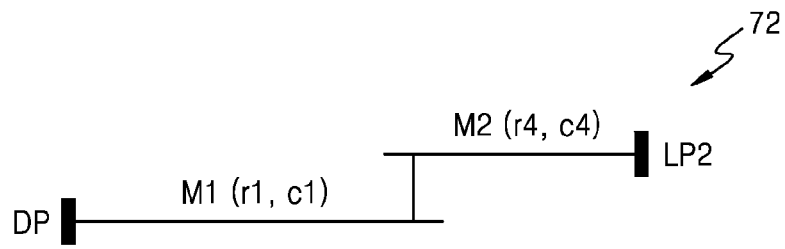
FIG. 7C illustrates a wiring structure of a second timing arc in FIG. 7A.

FIG. 7A illustrates an integrated circuit 70 according to an embodiment, FIG. 7B illustrates a wiring structure 71 of the first timing arc ARC1 in FIG. 7A, and FIG. 7C illustrates a wiring structure 72 of the second timing arc ARC2 in FIG. 7A. Hereinafter, information included in the layout data 100 of FIG. 6 will be described with reference to FIGS. 7A to 7C.

Referring to FIG. 7A, according to an embodiment, according to the layout data 100 for the integrated circuit 70, the integrated circuit 70 includes a first timing arc ARC1 and a second timing arc ARC2. The first timing arc ARC1 corresponds to a path from a driving pin DP to a first loading pin LP1 and includes first to third nodes N1 to N3. The second timing arc ARC2 corresponds to a path from the driving pin DP to a second loading pin LP2 and includes the first node N1 and a fourth node N4.

Referring to FIG. 7B, according to an embodiment, according to the layout data 100 for the integrated circuit 70, in the wiring structure 71 of the first timing arc ARC1, the first node N1 is implemented with a first metal layer M1 and has a first resistance r1 and a first capacitance c1. The second node N2 is implemented with a second metal layer M2 and has a second resistance r2 and a second capacitance c2. The third node N3 is implemented with the first metal layer M1 and has a third resistance r3 and a third capacitance c3.

Referring to FIG. 7C, according to an embodiment, according to the layout data 100 for the integrated circuit 70, in the wiring structure 72 of the second timing arc ARC2, the first node N1 is implemented with a first metal layer M1 and has a first resistance r1 and a first capacitance c1. The fourth node N4 is implemented with a second metal layer M2 and has a fourth resistance r4 and a fourth capacitance c4.

Figure 8A:
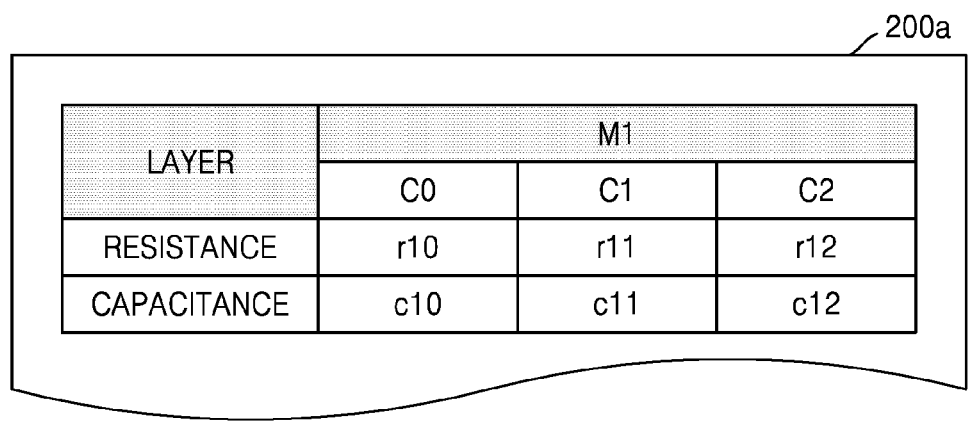
FIGS. 8A and 8B illustrate technology files according to an embodiment.
Figure 8B:
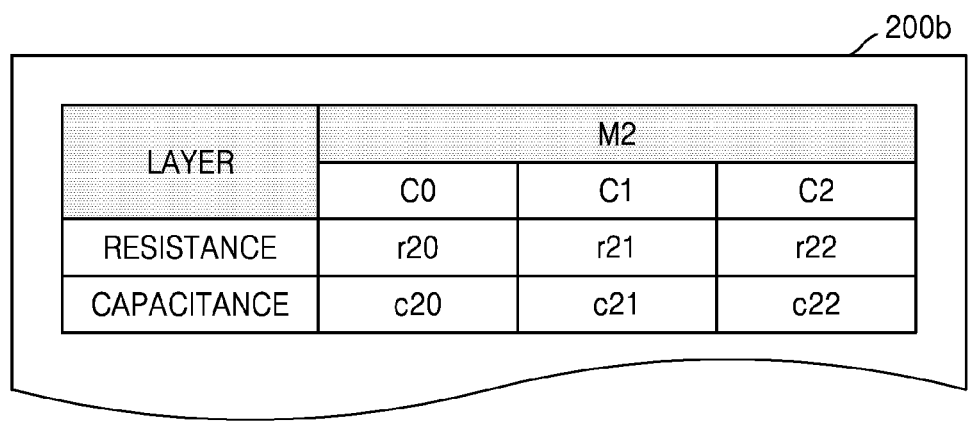

FIGS. 8A and 8B illustrate technology files 200a and 200b according to an embodiment.

Referring to FIG. 8A, according to an embodiment, the technology file 200a includes a plurality of corner values of parasitic components of a first metal layer M1, that is, a plurality of parasitic corner values. For example, the plurality of parasitic corner values correspond to the nominal corner C0 and the first and second corners C1 and C2 in FIG. 4. In other words, in the case of the nominal corner C0, the parasitic components of the first metal layer M1 correspond to a nominal resistance r10 and a nominal capacitance c10. In the case of the first corner C1, the parasitic components of the first metal layer M1 correspond to a first resistance r11 and a first capacitance c11. In the case of the second corner C2, the parasitic components of the first metal layer M1 correspond to a second resistance r12 and a second capacitance c12.

Referring to FIG. 8B, according to an embodiment, the technology file 200b includes a plurality of corner values of parasitic components of a second metal layer M2, that is, a plurality of parasitic corner values. For example, the plurality of parasitic corner values correspond to the nominal corner C0 and the first and second corners C1 and C2 in FIG. 4. In other words, in the case of the normal corner C0, the parasitic components of the second metal layer M2 correspond to a nominal resistance r20 and a nominal capacitance c20. In the case of the first corner C1, the parasitic components of the second metal layer M2 correspond to a first resistance r21 and a first capacitance c21. In the case of the second corner C2, the parasitic components of the second metal layer M2 correspond to a second resistance r22 and a second capacitance c22.

FIG. 9 illustrates an operation of characterizing a wire delay sensitivity coefficient $s_{ij}$, according to an embodiment.

Referring to FIGS. 6 and 9, according to an embodiment, in the parasitic component extraction operation S300, a wire delay sensitivity coefficient for each of the plurality of timing arcs corresponding to a net can be characterized based on the layout data 100 and the technology file 200. The wire delay sensitivity coefficient is characterized for each timing arc, for each layer Li, where i is a natural number, and for each corner Cj, where j is a natural number that is greater than or equal to 2. Thus, the number of wire delay sensitivity coefficients corresponding to a timing arc corresponds to the product of the number of layers in the timing arc and the number of corners.

According to an embodiment, the wire delay sensitivity coefficient can be characterized based on, for example, the Elmore delay model. A wire delay sensitivity coefficient $s_{ij}$ when parasitic components of an i-th layer are shifted to a j-th corner due to a global variation can be obtained from Equation 1.

$$s_{ij} = \alpha * \frac{\Delta W_{d\_ij}}{W_{d\_nom}} = \alpha * \frac{W_{d\_ij} - W_{d\_nom}}{W_{d\_nom}}$$

$$= \alpha * \frac{W_d(L1@C0.L2@C0, \ldots, Li@Cj, \ldots) - W_d(L1@C0, L2@C0, \ldots, Li@C0, \ldots)}{W_d(L1@C0, L2@C0, \ldots, Li@C0, \ldots)}$$

Equation 1

Here, i is a layer index, j is a corner index, Li@Cj denotes a case where the i-th layer moves to the j-th corner, and α is a scaling factor. The wire delay sensitivity coefficient $s_{ij}$ corresponds to a delay difference $\Delta W_{d\_ij}$ obtained by subtracting a nominal wire delay $W_{d\_nom}$ from a corner wire delay $W_{d\_ij}$, i.e., $\Delta W_{d\_ij} = W_{d\_ij} - W_{d\_nom}$. Specifically, the wire delay sensitivity coefficient $s_{ij}$ correspond to the ratio of the delay difference $\Delta W_{d\_ij}$ to the nominal wire delay $W_{d\_nom}$. The corner wire delay $W_{d\_ij}$ refers to a wire delay Wd(L1@C0, L2@C0, ..., Li@Cj, ...) when only the i-th layer Li in a timing arc corresponds to the j-th corner Cj and the other layers correspond to the nominal corner C0. The nominal wire delay $W_{d\_nom}$ refers to a wire delay Wd(L1@C0, L2@C0, ..., L1@C0, ...) when all the layers in the timing arc correspond to the nominal corner C0.

FIGS. 10A and 10B illustrate an operation of characterizing the wire delay sensitivity coefficient $s_{ij}$ in FIG. 9. FIG. 10A is a table of parasitic components extracted using the technology files 200a and 200b illustrated in FIGS. 8A and 8B from the layout data 100 corresponding to FIGS. 7A to 7C. FIG. 10B is a table of wire sensitivity coefficients that respectively correspond to metal layers of the first timing arc ARC1. Hereinafter, an operation of characterizing the wire delay sensitivity coefficient $s_{ij}$ of the first timing arc ARC1 will be described.

According to an embodiment, a nominal wire delay $W_{d\_nom}$ of the first timing arc ARC1 is obtained using parasitic resistances r1, r2, and r3 and parasitic capacitances c1, c2, and c3 when first and second metal layers M1 and M2 included in the first timing arc ARC1 correspond to the nominal corner C0. For example, when the Elmore delay model is used, the nominal wire delay $W_{d\_nom}$=r1(c1+c2+c3+c4)+r2(c2+c3)+r3(c3), for example, 18.

According to an embodiment, a corner wire delay $W_{d\_1j}$ of the first metal layer M1 is obtained using parasitic resistances r1', r2, and r3' and parasitic capacitances c1', c2, and c3' when first and third nodes N1 and N3 implemented with the first metal layer M1 correspond to the j-th corner Cj and a second node N2 implemented with the second metal layer M2 corresponds to the nominal corner C0. For example, when the Elmore delay model is used, the corner wire delay $W_{d\_1j}$ of the first metal layer M1 is equal to r1'(c1'+c2+c3'+c4)+r2(c2+c3')+r3'(c3'), for example, 20. Thus, a delay difference $\Delta W_{d\_1j}$ that corresponds to the first metal layer M1 is 2, and a wire delay sensitivity coefficient $s_{ij}$ of the first metal layer M1 is 2/18, i.e., 0.11. Thus, due to process variations of the first metal layer M1, a wire delay of the first timing arc ARC1 increases by 11% when the first metal layer M1 corresponds to the j-th corner Cj, compared to when the first metal layer M1 corresponds to the nominal corner C0.

According to an embodiment, a corner wire delay $W_{d\_2j}$ of the second metal layer M2 is obtained using parasitic resistances r1, r2', and r3 and parasitic capacitances c1, c2', and c3 when the second node N2 implemented with the second metal layer M2 corresponds to the j-th corner Cj and the first and third nodes N1 and N3 implemented with the first metal layer M1 correspond to the nominal corner C0. For example, when the Elmore delay model is used, the corner wire delay $W_{d\_2j}$ of the second metal layer M2 is equal to r1(c1+c2'+c3+c4')+r2'(c2'+c3)+r3(c3), for example, 19. Thus, a delay difference $\Delta W_{d\_2j}$ that corresponds to the second metal layer M2 is 1, and a wire delay sensitivity coefficient $s_{2j}$ of the second metal layer M2 is 1/18, i.e., 0.06. Thus, due to process variations of the second metal layer M2, the wire delay of the first timing arc ARC1 increases by 6% when the second metal layer M2 corresponds to the j-th corner Cj, compared to when the second metal layer M2 corresponds to the nominal corner C0.

According to an embodiment, in the parasitic component extraction operation S300, a random wire delay sensitivity coefficient rs can be characterized by considering a local random variation, based on the wire delay sensitivity coefficient $s_{ij}$. The random wire delay sensitivity coefficient rs is characterized for each timing arc. Thus, the number of random wire delay sensitivity coefficients rs corresponding to the timing arc is one. The random wire delay sensitivity coefficient rs can be calculated from Equation 2.

$$rs = \beta * \sqrt{\sum_i (s_{ij})^2} \qquad \text{Equation 2}$$

Here, β is a scaling factor.

Figures 11, 12:
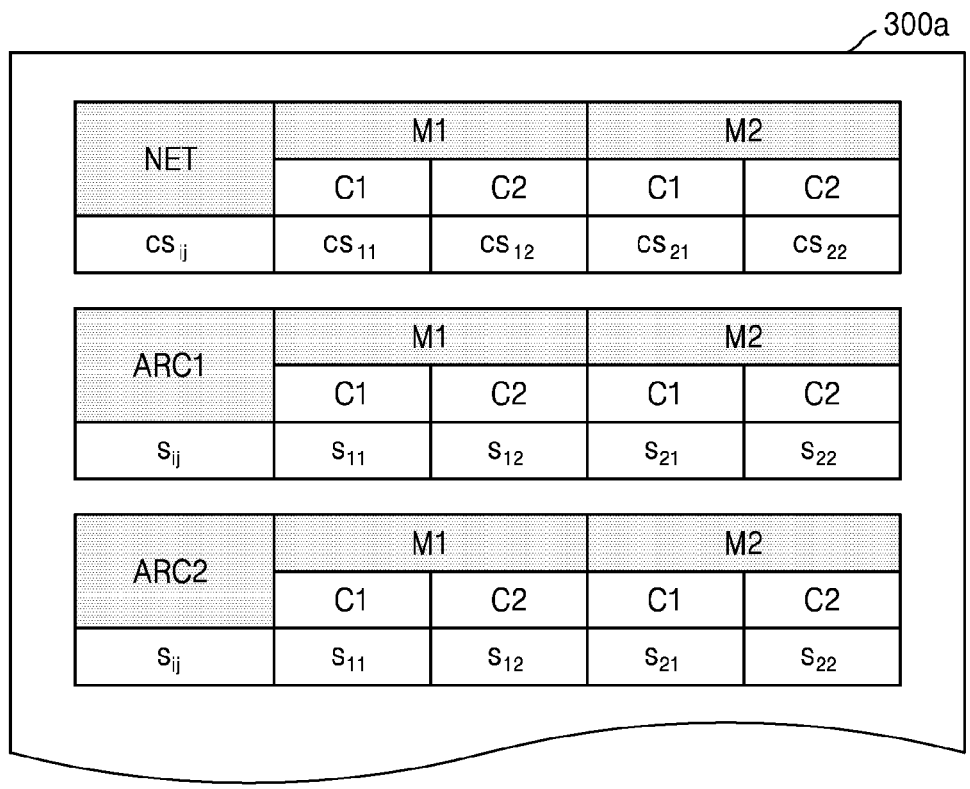
FIG. 11 illustrates an operation of characterizing a capacitance sensitivity coefficient, according to an embodiment.
FIG. 12 illustrates a parasitic component description file according to an embodiment.

FIG. 11 illustrates an operation of characterizing a capacitance sensitivity coefficient $c_{ij}$ according to an embodiment.

Referring to FIGS. 6 and 11, in the parasitic component extraction operation S300, a capacitance sensitivity coefficient of a net can be characterized based on the layout data 100 and the technology file 200. The capacitance sensitivity coefficient is characterized for each layer Li, where i is a natural number, and for each corner Cj, where j is a natural number that is greater than or equal to 2. Thus, the number of capacitance sensitivity coefficients that correspond to the net corresponds to the product of the number of layers in the net and the number of corners.

According to an embodiment, the capacitance sensitivity coefficient can also be obtained by calculating a capacitance difference of a net based on a corner, similar to the delay sensitivity coefficient. A capacitance sensitivity coefficient $cs_{ij}$ when parasitic components of an i-th layer are shifted to a j-th corner due to a global variation is obtained using Equation 3.

$$cs_{ij} = \alpha * \frac{\Delta C_{total\_ij}}{C_{total\_nom}} = \alpha * \frac{C_{total\_ij} - C_{total\_nom}}{C_{total\_nom}}$$

$$= \alpha * \frac{C_{total}(L1@C0, L2@C0, \ldots, Li@Cj, \ldots) - C_{total}(L1@C0, L2@C0, \ldots, Li@C0, \ldots)}{C_{total}(L1@C0, L2@C0, \ldots, Li@C0, \ldots)}$$

Equation 3

The capacitance sensitivity coefficient $cs_{ij}$ corresponds to a capacitance difference $\Delta C_{total\_ij}$ obtained by subtracting a nominal capacitance $C_{total\_nom}$ from a corner capacitance $C_{total\_ij}$, i.e., $\Delta C_{total\_ij} = C_{total\_ij} - C_{total\_nom}$. Specifically, the capacitance sensitivity coefficient $cs_{ij}$ corresponds to a ratio of the capacitance difference $\Delta C_{total\_ij}$ to the nominal capacitance $C_{total\_nom}$. The corner capacitance $C_{total\_ij}$ refers to the total capacitance $C_{total}$(L1@C0, L2@C0, . . . , L1@Cj, . . . ) of a net when only an i-th layer Li in the net corresponds to a j-th corner Cj and the other layers correspond to a nominal corner C0. The nominal capacitance $C_{total\_nom}$ refers to the total capacitance $C_{total}$(L1@C0, L2@C0, . . . , Li@C0, . . . ) of the net when all the layers in the net correspond to the nominal corner C0.

According to an embodiment, in the parasitic component extraction operation S300, a random capacitance sensitivity coefficient rcs is characterized by considering a local random variation, based on the capacitance sensitivity coefficient $cs_{ij}$. The random capacitance sensitivity coefficient rcs is characterized for each net. Thus, the number of random capacitance sensitivity coefficients rcs that correspond to the net is one. The random capacitance sensitivity coefficient rcs can be calculated from Equation 4.

$$rcs = \beta * \sqrt{\sum_i (cs_{ij})^2} \qquad \text{Equation 4}$$

FIG. 12 illustrates a parasitic component description file 300a according to an embodiment.

Referring to FIG. 12, according to an embodiment, the parasitic component description file 300a is generated for each of a plurality of nets in an integrated circuit. For example, as shown in FIGS. 7A to 7C, the net corresponds to first and second timing arcs ARC1 and ARC2, and each of the first and second timing arcs ARC1 and ARC2 includes first and second metal layers M1 and M2. The parasitic component description file 300a includes a capacitance sensitivity coefficient $cs_{ij}$ of the net, a wire delay sensitivity coefficient $s_{ij}$ of the first timing arc ARC1, and a wire delay sensitivity coefficient $s_{ij}$ of the second timing arc ARC2. The wire delay sensitivity coefficient $s_{ij}$ is generated for first and second corners C1 and C2 for each of the first and second metal layers M1 and M2. For example, the number of wire delay sensitivity coefficients $s_{ij}$ is four for the first timing arc ARC1 and four for the second timing arc ARC2.

Figure 13:
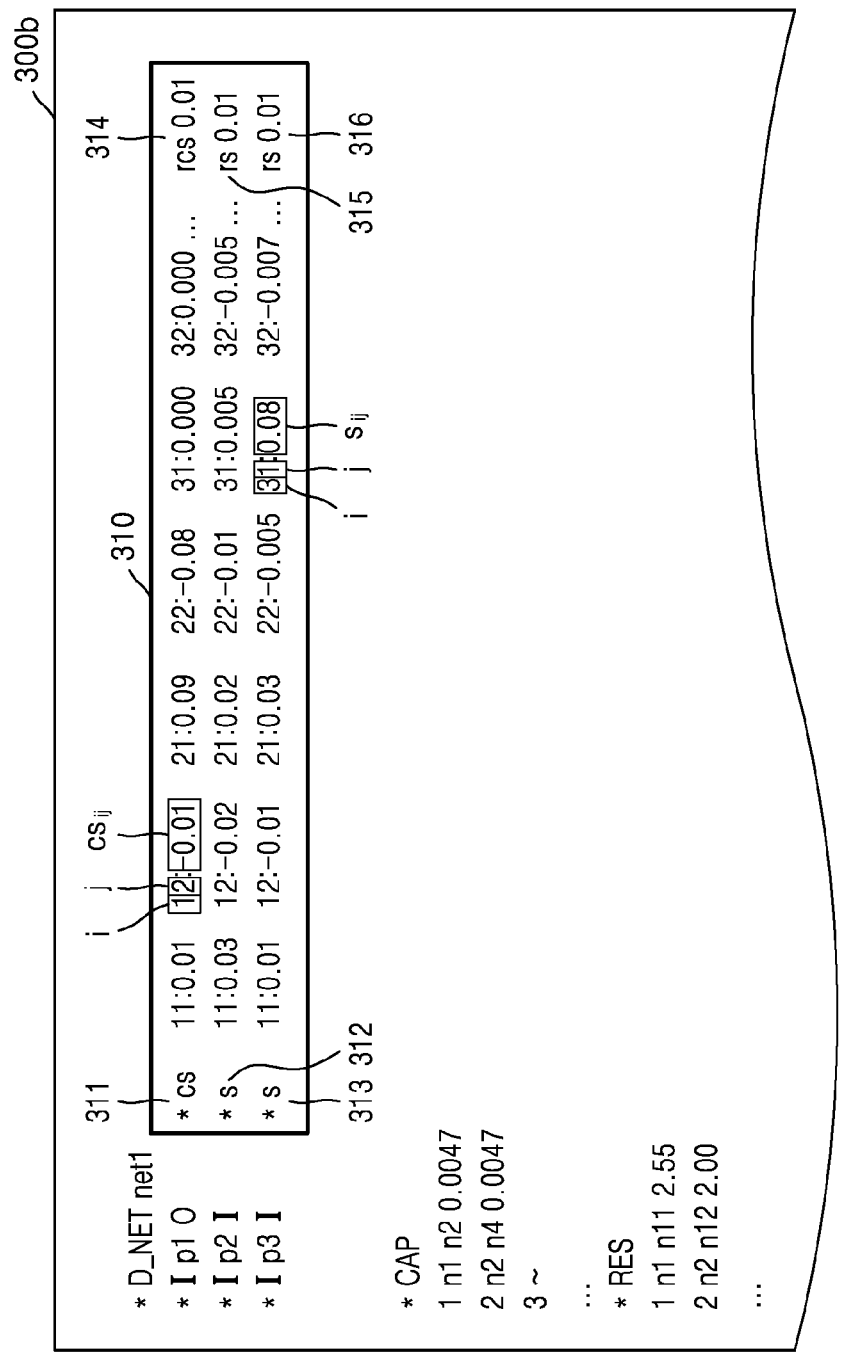
FIG. 13 illustrates a parasitic component description file according to an embodiment.

FIG. 13 illustrates a parasitic component description file 300b according to an embodiment. FIG. 13 corresponds to a detailed embodiment of FIG. 12, and can be generated, for example, with an SPEF file.

Referring to FIG. 13, the parasitic component description file 300b includes parasitic component data 310, and the parasitic component data 310 includes a capacitance sensitivity coefficient 311, a wire delay sensitivity coefficient 312 of a first timing arc, and a wire delay sensitivity coefficient 313 of a second timing arc. For example, when a first layer corresponds to a second corner, a capacitance sensitivity coefficient $cs_{12}$ of a net is −0.01. For example, when a second layer corresponds to a first corner, a wire delay sensitivity coefficient $s_{21}$ of the first timing arc is 0.02. For example, when a third layer corresponds to the first corner, a wire delay sensitivity coefficient $s_{31}$ of the second timing arc is 0.08.

In addition, according to an embodiment, the parasitic component data 310 further includes a random capacitance sensitivity coefficient 314, a random wire delay sensitivity coefficient 315 of the first timing arc, and a random wire delay sensitivity coefficient 316 of the second timing arc. For example, the random capacitance sensitivity coefficient 314 is 0.01, the random wire delay sensitivity coefficient 315 of the first timing arc is 0.01, and the random wire delay sensitivity coefficient 316 of the second timing arc 314 is 0.01.

Figure 14:
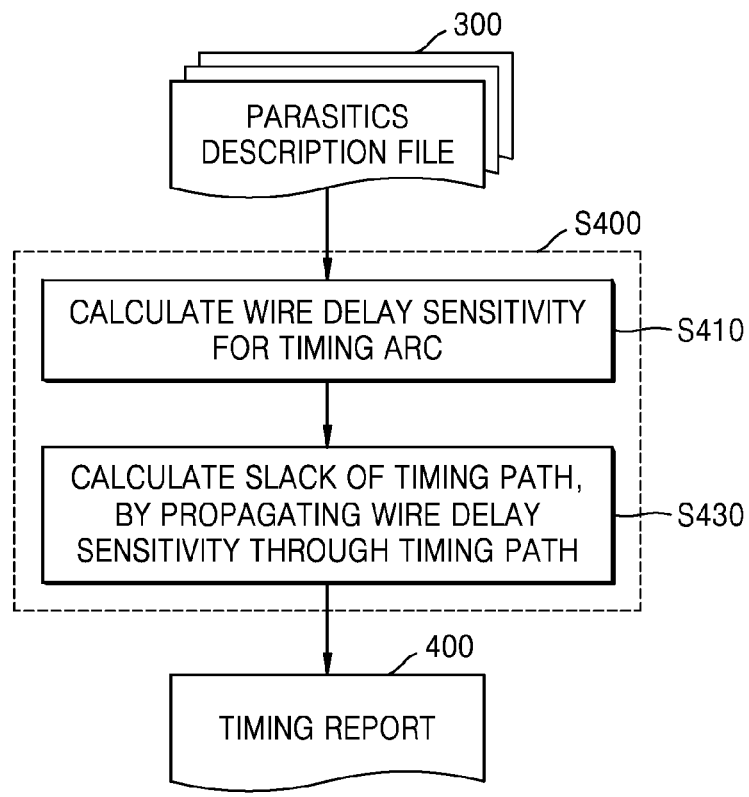
FIG. 14 is a flowchart of a method of performing a timing analysis, according to an embodiment.

FIG. 14 is a flowchart of a method of performing a timing analysis, according to an embodiment.

Referring to FIG. 14, according to an embodiment, a timing analysis method according to a present embodiment corresponds to, for example, operation S170 in FIG. 1 or operation S250 in FIG. 5. In addition, a timing analysis method according to a present embodiment is performed after the parasitic component extraction method of FIG. 6. Thus, the description given above with reference to FIGS. 1 to 13 apply to a present embodiment. In operation S400, a static timing analysis operation is performed based on a plurality of parasitic component description files 300, thereby generating a timing report 400 that includes wire delay variations based on a global variation. Operation S400 includes operations S410 and S430.

In operation S410, according to an embodiment, a wire delay sensitivity for a timing arc is calculated. The phrase wire delay sensitivity refers to a delay sensitivity due to a wire variation. Specifically, wire delay sensitivity refers to a delay effect when parasitic components of a layer have corner values, that is, when the layer corresponds to a corner, due to process variations of the layer. Specifically, a wire delay sensitivity $a_{ij}$ represents a wire delay difference between a j-th corner Cj and a nominal corner C0 with respect to an i-th layer Li. In an embodiment, the wire delay sensitivity $a_{ij}$ is obtained from the product of a nominal wire delay $W_{d\_nom}$ and a wire delay sensitivity coefficient $s_{ij}$, i.e., $a_{ij}=W_{d\_nom}*s_{ij}$.

Specifically, according to an embodiment, by calculating wire delay sensitivity for all layers and all corners, a canonical format of the wire delay sensitivity can be expressed as a wire delay sensitivity vector $\Delta W_d$ as shown in Equation 5.

$$\Delta W_d = \sum_i \left( \sum_j a_{ij} C_j \right) Li \quad \text{Equation 5}$$

Here, i is a layer index, j is a corner index, and Li is a layer variable that has a value of 0 or 1. When no wire variation occurs, Li is 0, and when a wire variation occurs, Li is 1. For example, when no variation of a first metal layer occurs, L1 is 0, and when a variation of the first metal layer occurs, L1 is 1. j is a corner index, Cj is a variable having a value of 0 or 1, and the sum of Cj is 1, i.e., $\Sigma_j$ Cj=1. When parasitic components are shifted to a j-th corner due to global variations, Cj is 1, and when no parasitic components are shifted to the j-th corner, Cj is 0.

According to an embodiment, in operation S430, a slack of a timing path is calculated by propagating a wire delay sensitivity through the timing path. For example, when the timing path includes first and second nets, the propagation of a wire delay sensitivity vector is performed by adding a first wire delay sensitivity vector A of the first net to a second wire delay sensitivity vector B of the second net, or by subtracting the second wire delay sensitivity vector B of the second net from the first wire delay sensitivity vector A of the first net. Thus, a propagated wire delay sensitivity vector Z is obtained by the addition/subtraction of the first and second wire delay sensitivity vectors A and B, i.e., Z=A±B. The propagated wire delay sensitivity vector Z is expressed by Equation 6.

$$Z = \sum_i \left(\sum_j z_{ij} c_j\right) L_i = \sum_i \left(\sum_j a_{ij} c_j\right) L_i \pm \sum_i \left(\sum_j b_{ij} c_j\right) L_i = \sum_i \left(\sum_j (a_{ij} \pm b_{ij}) c_j\right) L_i \quad \text{Equation 6}$$

According to an embodiment, the worst wire delay sensitivity, which denotes wire delay sensitivity when a wire delay propagated through a timing path due to a wire variation is the slowest, is obtained from Equation 7.

$$\Delta W_{d,wst} = \sqrt{\sum_i \left(\max_j \{a_{i1}, a_{i2}, a_{ij}, \ldots \}\right)^2} . \quad \text{Equation 7}$$

On the other hand, according to an embodiment, the best wire delay sensitivity, which denotes wire delay sensitivity when the wire delay propagated through the timing path due to the wire variation is the fastest, is obtained from Equation 8.

$$\Delta W_{d,bst} = -1 * \sqrt{\sum_i \left(\min_j \{0, a_{i1}, a_{i2}, a_{ij}, \ldots \}\right)^2} \quad \text{Equation 8}$$

Next, according to an embodiment, a statistically pessimistic slack is calculated from the propagated wire delay sensitivity vector Z. In calculating the slack of a timing path, the best value is obtained from a delay sensitivity vector determined from a difference between a required time of a capture path and an arrival time of a launch path. Specifically, the slack is calculated from Equation 9.

$$\Delta W_d = \Sigma_i(\Sigma_j a_{ij} c_j) L_i = \Sigma_i(\Sigma_j (\text{arr}_{ij} - \text{req}_{ij}) c_j) L_i \quad \text{Equation 9}$$

Here, $\text{arr}_{ij}$ is the arrival time of a launch path, and $\text{req}_{ij}$ is the required time of a capture path. For example, a slack corresponding to 3-sigma standard deviation is obtained from Equation 10.

$$\text{slack}_{3sigma} = \text{slack}_u + 3*\Delta W_{d,bst} \quad \text{Equation 10}$$

The slack corresponding to the 3-sigma standard deviation corresponds to a value that reflects the best sensitivity of a 3-sigma level to an average value of the slack, that is, a nominal value $slack_u$. Thus, a slack corresponding to N-sigma standard deviation corresponds to a value that reflects the best sensitivity, i.e., $N*\Delta W_{d,bst}$, of an N-sigma level to the average value of the slack, that is, the nominal value $slack_u$. In this manner, based on a calculated slack, it can be determined whether a timing path satisfies a timing requirement.

Figure 15:
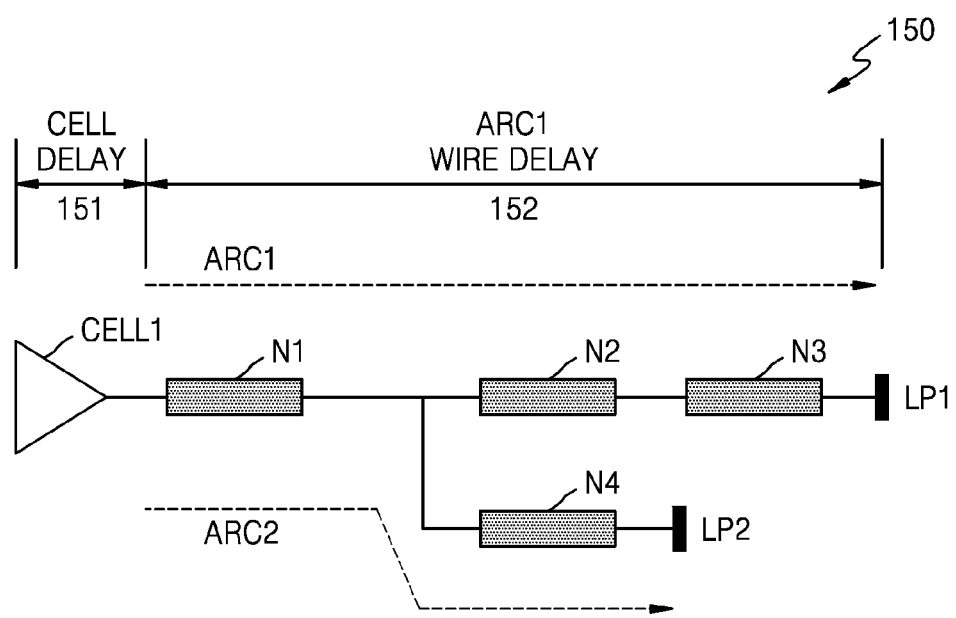
FIG. 15 illustrates an integrated circuit according to an embodiment.

FIG. 15 illustrates an integrated circuit 150 according to an embodiment.

Referring to FIG. 15, according to an embodiment, the integrated circuit 150 includes a first cell CELL1, which is a driving cell, and first and second timing arcs ARC1 and ARC2. For example, the first and second timing arcs ARC1 and ARC2 correspond to those shown in FIGS. 7A to 7C. Hereinafter, the integrated circuit 150 will be described with reference to FIGS. 7A to 7C and FIG. 15.

According to an embodiment, a delay from the first cell CELL1 to a first loading pin LP1 corresponds to the sum of a cell delay 151 generated in the first cell CELL1 and a wire delay 152 generated in the first timing arc ARC1. A wire variation can affect not only the wire delay 152 but also the cell delay 151. For example, when process variations of a first metal layer M1 occur, the wire delay 152 of the first timing arc ARC1 and the cell delay 151 can both change. Hereinafter, a method of performing a timing analysis by considering a cell delay variation due to a wire variation will be described with reference to FIG. 16.

Figure 16:
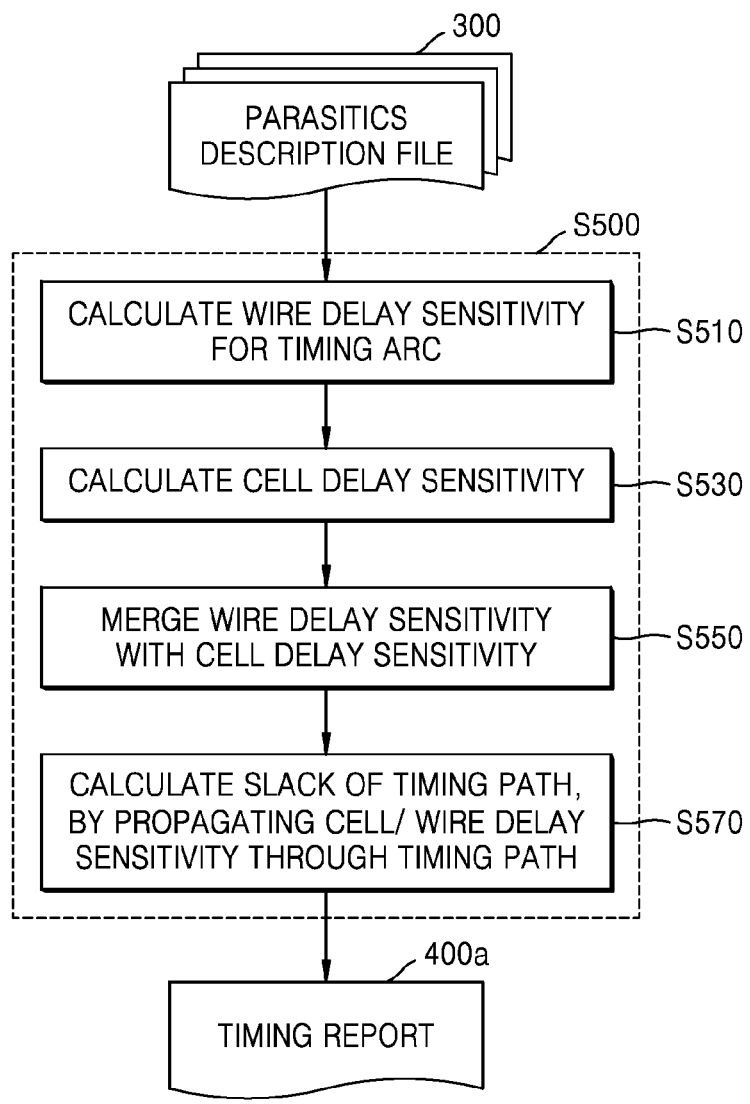
FIG. 16 is a flowchart of a method of performing a timing analysis, according to an embodiment.

FIG. 16 is a flowchart that illustrates a method of performing a timing analysis, according to an embodiment. FIG. 17 illustrates an example of a timing analysis method of FIG. 16. Hereinafter, a timing analysis method according to a present embodiment will be described with reference to FIGS. 15 to 17.

A timing analysis method according to a present embodiment corresponds to a modification of that of FIG. 14. Thus, the description given above with reference to FIGS. 14 and 15 apply to a present embodiment. In operation S500, a static timing analysis operation is performed based on a plurality of parasitic component description files 300 to generate a timing report 400a that includes a wire delay variation and a cell delay variation based on a global variation. Operation S500 includes operations S510 to S570.

According to an embodiment, in operation S510, a wire delay sensitivity of a timing arc is calculated. For example, a wire delay sensitivity $a_{ij}$ of the first timing arc ARC1 is calculated by multiplying a nominal wire delay $W_{d\_nom}$ by a wire delay sensitivity coefficient $s_{ij}$. For example, the nominal wire delay $W_{d\_nom}$ of the first timing arc ARC1 is 5 pico seconds (ps). Thus, a wire delay sensitivity for the first metal layer M1 is 1 ps at a first corner C1 and −1 ps at a second corner C2. A wire delay sensitivity for the second metal layer M2 is −0.5 ps at the first corner C1 and 2.5 ps at the second corner C2.

According to an embodiment, in operation S530, a cell delay sensitivity is calculated. For example, a cell delay sensitivity $a'_{ij}$ is calculated using a cell characterization function in a standard cell library. Specifically, the cell delay sensitivity $a'_{ij}$ is calculated as shown in Equation 11 by using an input slew of a cell and a capacitance $C_{total}$ of a timing arc connected to an output terminal of the cell.

$$a'_{ij}=f(\text{slew},C_{total}*cs_{ij})-f(\text{slew},C_{total}) \quad \text{Equation 11}$$

For example, a nominal cell delay $C_{d\_nom}$ of a first cell CELL1 is 10 ps. In this case, cell delay sensitivity for the first metal layer M1 is 3 ps at the first corner C1 and −3 ps at the second corner C2. Cell delay sensitivity for the second metal layer M2 is 1 ps at the first corner C1 and −1 ps at the second corner C2.

According to an embodiment, in operation S550, a cell/wire delay sensitivity $a''_{ij}$ is calculated by merging the wire delay sensitivity $a_{ij}$ with the cell delay sensitivity $a'_{ij}$. The cell/wire delay sensitivity $a''_{ij}$ corresponds to a global delay variation due to a global variation of a wire, and is referred to as a global delay sensitivity. Specifically, the cell/wire delay sensitivity $a''_{ij}$ is calculated from Equation 12.

$$a''_{ij}=W_{d\_nom}*s_{ij}+f(\text{slew},C_{total}*cs_{ij})-f(\text{slew},C_{total}) \quad \text{Equation 12}$$

Here, i is a layer index and j is a corner index. The cell/wire delay sensitivity $a''_{ij}$ represents a cell/wire delay difference between a j-th corner Cj of an i-th layer and a nominal corner C0. A cell/wire delay sensitivity vector $\Delta W'_d$ is expressed by Equation 13 by calculating the cell/wire delay sensitivity $a''_{ij}$ with respect to all layers and all corners.

$$\Delta W'_d = \sum_i \left( \sum_j a''_{ij} Cj \right) Li \quad \text{Equation 13}$$

According to an embodiment, since the cell/wire delay sensitivity $a''_{ij}$ includes both the delay sensitivity of a cell and the delay sensitivity of a wire due to any wire variations, the cell/wire delay sensitivity is referred to as a total impact. For example, the total impact of the first metal layer M1 is 4 ps at the first corner C1 and −4 ps at the second corner C2. The total impact of the second metal layer M2 is 0.5 ps at the first corner C1 and 1.5 ps at the second corner C2.

According to an embodiment, in operation S570, the slack of a timing path is calculated by propagating the cell/wire delay sensitivity $a''_{ij}$ through the timing path. The propagation of the cell/wire delay sensitivity $a''_{ij}$ is performed using Equation 6. Based on the propagated cell/wire delay sensitivity, a corner having the maximum sensitivity for each layer is selected as the worst corner. For example, in the case of the first metal layer M1, the first corner C1 is selected as the worst corner, and in the case of the second metal layer M2, the second corner C2 is selected as the worst corner.

Next, according to an embodiment, the statistical worst sensitivity is calculated by performing a root sum square (RSS) between the maximum sensitivities. For example, the statistical worst sensitivity is calculated as 4.3 ps by performing RSS between 4 ps, which is the maximum sensitivity at the worst corner C1 of the first metal layer M1, and 1.5 ps, which is the maximum sensitivity at the worst corner C2 of the second metal layer M2.

Figure 18:
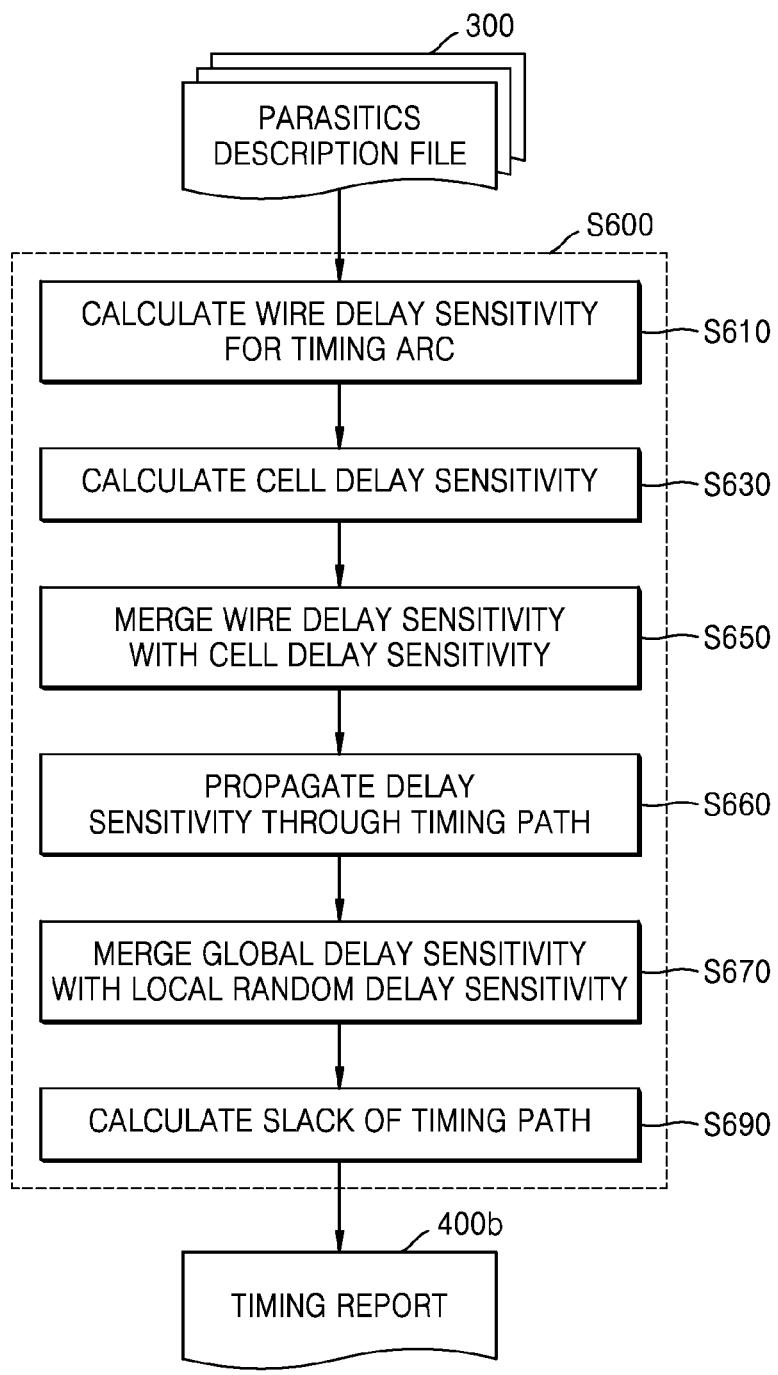
FIG. 18 is a flowchart of a method of performing a timing analysis, according to an embodiment.

FIG. 18 is a flowchart of a method of performing a timing analysis, according to an embodiment.

Referring to FIG. 18, a timing analysis method according to a present embodiment corresponds to a modification of that of FIG. 16. Thus, the description given above with reference to FIGS. 16 and 17 applies to a present embodiment. In operation S600, a static timing analysis operation is performed based on a plurality of parasitic component description files 300 to generate a timing report 400b that includes a delay variation based on a global variation and a local random variation. Operation S600 includes operations S610 to S690.

According to an embodiment, in operation S610, the wire delay sensitivity for a timing arc is calculated. In operation S630, the cell delay sensitivity is calculated. In operation S650, the cell/wire delay sensitivity, that is, the global delay sensitivity, is calculated by merging the wire delay sensitivity with the cell delay sensitivity. This process can be similarly used for the calculation of the local random delay sensitivity. Operations S610 to S650 correspond to operations S510 to S550 in FIG. 16, respectively.

According to an embodiment, specifically, a local random delay sensitivity $a_r$ is calculated from Equation 14.

$$a_r = \sqrt{(W_{d\_nom} * rs)^2 + \{f(slew, C_{total} * rs_{ij}) - f(slew, C_{total})\}^2}$$ Equation 14

According to an embodiment, in operation S660, the delay sensitivity is propagated through a timing path. Specifically, the global delay sensitivity and the local random delay sensitivity are propagated through the timing path. In the propagation operation, a total delay sensitivity vector $\Delta W''_d$ that includes the global delay sensitivity and the local random delay sensitivity are expressed by Equation 15.

$$\Delta W''_d = \sum_i \left( \sum_j a''_{ij} C_j \right) Li + a_r X_r$$ Equation 15

Here, $a''_{ij}$ is the cell/wire delay sensitivity calculated from Equation 12, and $X_r$ is a random variable for a random variation.

According to an embodiment, in operation S670, the total delay variation is calculated by merging the global delay sensitivity with the local random delay sensitivity. In this case, the worst delay sensitivity is obtained from Equation 16.

$$\Delta W_{d,wst} = \sqrt{\sum_i (\max_j \{a_{i1}, a_{i2}, a_{ij}, \dots \})^2 + a_r^2}$$ Equation 16

On the other hand, according to an embodiment, the best delay sensitivity is obtained from Equation 17.

$$\Delta W_{d,bst} = -1 * \sqrt{\sum_i (\min_j \{0, a_{i1}, a_{i2}, a_{ij}, \dots \})^2 + a_r^2}$$ Equation 17

According to an embodiment, is operation S690, the slack of the timing path is calculated. A statistically pessimistic slack is calculated from the total delay sensitivity vector. In calculating the slack of the timing path, the best value is obtained from a delay sensitivity vector determined from a difference between a required time of a capture path and an arrival time of a launch path. For example, the slack corresponding to 3-sigma standard deviation is obtained from Equation 10 described above.

Figure 19:
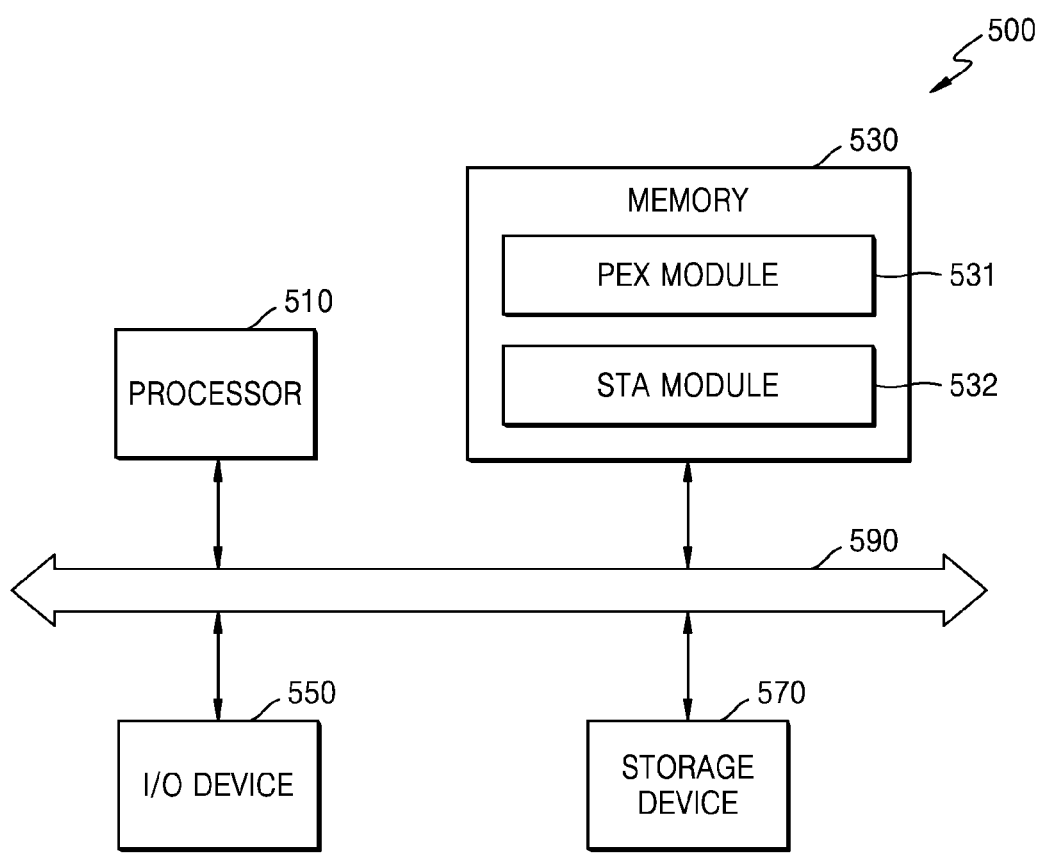
FIG. 19 is a block diagram of a computing system for designing an integrated circuit, according to an embodiment.

FIG. 19 is a block diagram of a computing system 500 for designing an integrated circuit according to an embodiment.

Referring to FIG. 19, the computing system, hereinafter referred to as an "integrated circuit design system", 500 for designing an integrated circuit includes a processor 510, a memory 530, an input/output (I/O) device 550, a storage device 570, and a bus 590. The integrated circuit design system 500 designs an integrated circuit and includes operations S110 to S170 of FIG. 1, operations S210 to S250 of FIG. 5, operation S300 of FIG. 6, operation S400 of FIG. 14, operation S500 of FIG. 16, or operation S600 of FIG. 18. In an embodiment, the integrated circuit design system 500 is implemented as an integrated device, and accordingly, it can also be referred to as an integrated circuit design apparatus. The integrated circuit design system 500 may be provided as a dedicated apparatus for designing an integrated circuit of a semiconductor device, or may be a computer that executes various simulation tools or design tools.

According to an embodiment, the processor 510 can execute instructions that perform at least one of various operations for designing an integrated circuit. The processor 510 communicates with the memory 530, the I/O device 550, and the storage device 570 through the bus 590. The processor 510 executes an integrated circuit design operation by executing a PEX module 531 and an STA module 532 loaded in the memory 530.

According to an embodiment, the memory 530 stores the PEX module 531 and the STA module 532. In addition, the memory 530 stores a synthesis module and a P&R module. The PEX module 531 and the STA module 532 are loaded from the storage device 570 into the memory 530. The memory 530 may be, for example, a volatile memory such as static random access memory (SRAM) or dynamic random access memory (DRAM), or a nonvolatile memory such as a PRAM, an MRAM, an ReRAM, an FRAM, or a NOR flash memory.

According to an embodiment, the PEX module 531 is, for example, a program that includes a plurality of instructions that perform a parasitic extraction operation based on operation S150 of FIG. 1, operation S230 of FIG. 5, or operation S300 of FIG. 6. The STA module 532 is, for example, a program that includes a plurality of instructions that perform a timing analysis operation based on operation S170 of FIG. 1, operation S250 of FIG. 5, operation S400 of FIG. 14, operation S500 of FIG. 16, or operation S600 of FIG. 18.

According to an embodiment, the I/O device 550 controls user input and output from user interface devices. For example, the I/O device 550 includes input devices such as a keyboard, a mouse, and/or a touch pad to receive input data that define an integrated circuit. For example, the I/O device 550 includes output devices such as a display and/or a speaker to display placement results, routing results, and/or timing analysis results.

According to an embodiment, the storage device 570 stores various data related to the PEX module 531 and the STA module 532. The storage device 570 may be, for example, a memory card, such as an MMC, an eMMC, an SD, or a MicroSD, a solid state drive, or a hard disk drive.

Figure 20:
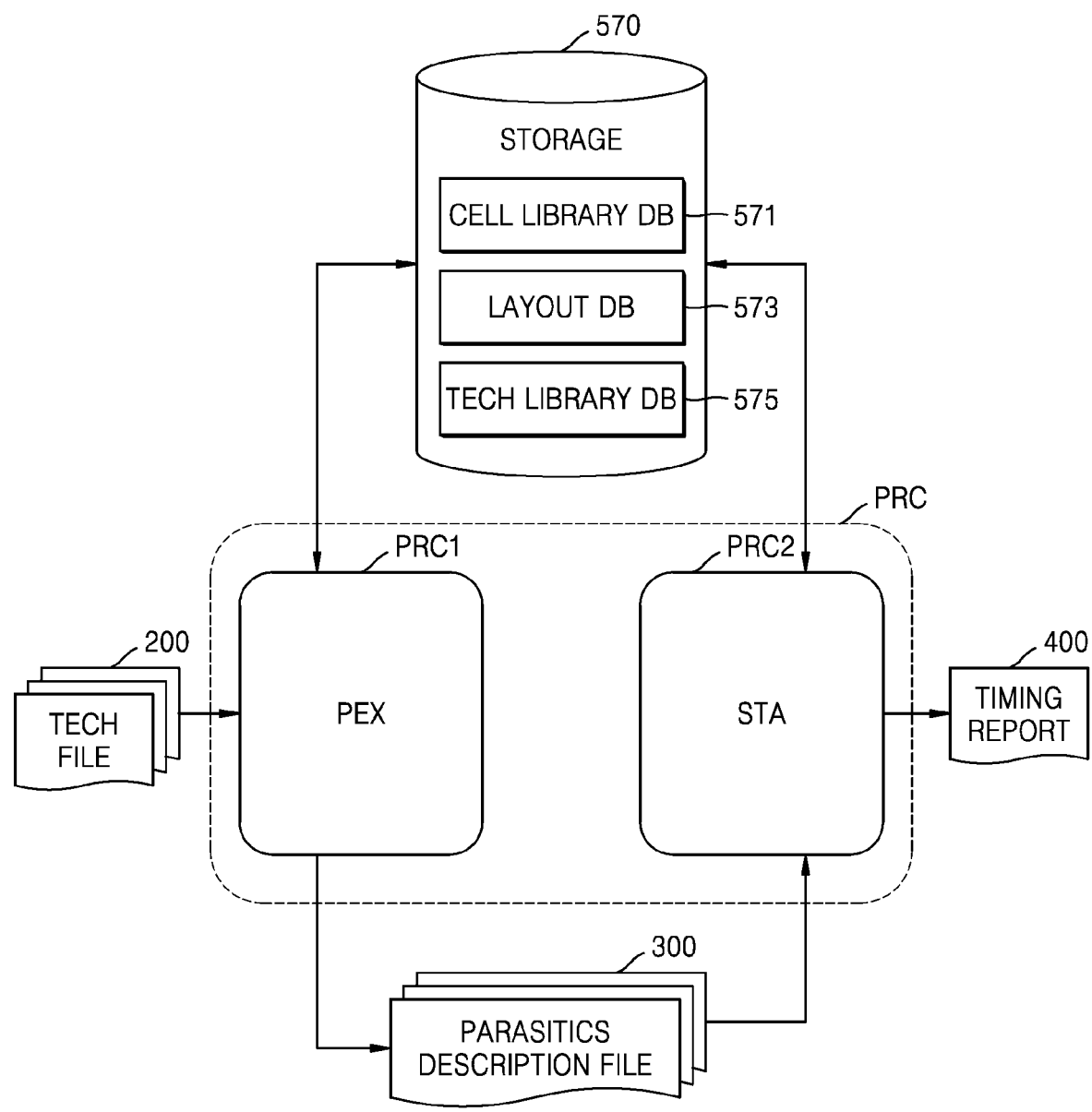
FIG. 20 illustrates an example of a program stored in a memory of FIG. 19, according to an embodiment.

FIG. 20 illustrates an example of a program stored in the memory 530 of FIG. 19, according to an embodiment.

Referring to FIGS. 19 and 20, the program stored in the memory 530 includes a plurality of procedures PRC, and each procedure includes a series of instructions for performing a particular task. The procedure may also be referred to as a function, a routine, a subroutine, or a subprogram. According to a present embodiment, the procedures PRC include a parasitic component extractor PRC1 and a static timing analyzer PRC2. Specifically, the PEX module 531 includes the parasitic component extractor PRC1, and the STA module 532 includes the static timing analyzer PRC2. In a present specification, performing an operation by executing a procedure, such as the parasitic component extractor PRC1 or the static timing analyzer PRC2, by the processor 510 of FIG. 19 is represented as performing the operation by the procedure, such as the parasitic component extractor PRC1 or the static timing analyzer PRC2.

According to an embodiment, the storage device 570 includes a cell library database (DB) 571, a layout DB 573, and a technology file DB 575. The cell library DB 571 stores information about a standard cell that is used to generate a layout of an integrated circuit, and is referred to as a standard cell library DB. The layout DB 573 stores information about a layout generated by procedures, for example, physical information about the layout. The technology file DB 575 stores a technology file that designates materials and rules used in an integrated circuit manufacturing process. The technology file DB 575 stores, for example, layer definitions, device definitions, or design rules. In a present embodiment, the technology file DB 575 stores corner values of parasitic components that correspond respectively to a plurality of metal layers.

According to an embodiment, the parasitic component extractor PRC1 generates a parasitic component description file 300 that includes delay variation information of a timing arc by performing a parasitic component extraction operation on corners of each layer based on the layout data and a technology file 200. The static timing analyzer PRC2 generates a timing report by performing a static timing analysis operation based on the parasitic component description file 300.

Figure 21:
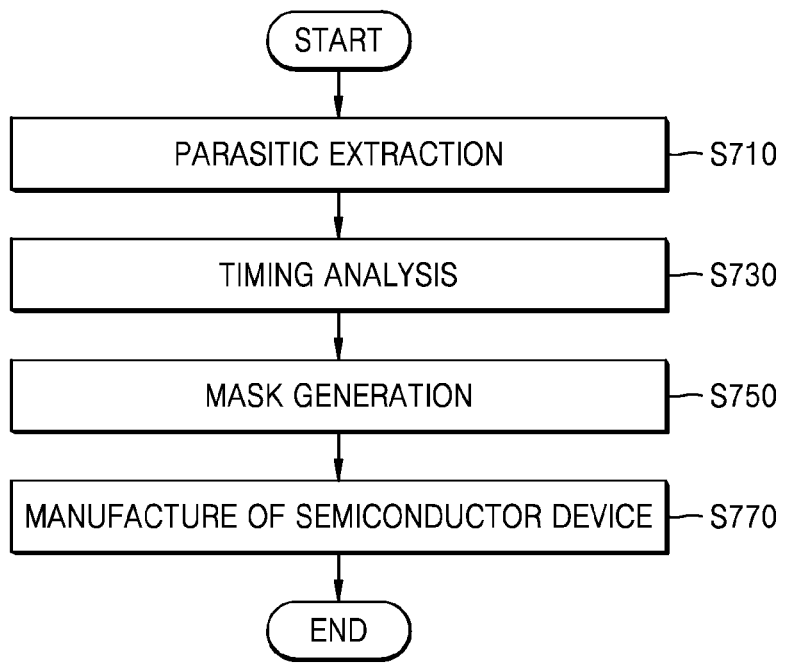
FIG. 21 is a flowchart of a method of manufacturing a semiconductor device, according to an embodiment.

FIG. 21 is a flowchart of a method of manufacturing a semiconductor device, according to an embodiment.

Referring to FIG. 21, according to an embodiment, a semiconductor device manufacturing method is divided into an integrated circuit design process and an integrated circuit manufacturing process. The integrated circuit design process includes operations S710 and S730, and the integrated circuit manufacturing process includes operations S750 and S770, and are performed in a semiconductor process module that manufactures a semiconductor device based on an integrated circuit based on layout data. A semiconductor device manufacturing method according to a present embodiment manufactures a semiconductor device by performing the integrated circuit design method described above with reference to FIGS. 1 to 20. Specifically, operations S710 and S730 correspond respectively to operations S50 and S170 of FIG. 1, and the embodiments described above with reference to FIGS. 1 to 20 apply to a present embodiment.

According to an embodiment, in operation S750, a mask is generated based on the layout data. The layout data is modified based on timing analysis data generated in operation S730, and a mask is generated based on the modified layout data. Specifically, optical proximity correction (OPC) is first performed based on the layout data, where OPC refers to a process of modifying the layout by reflecting errors due an optical proximity effect. Subsequently, a mask is manufactured according to a layout modified based on the OPC performance results. In this case, a mask is manufactured using the OPC modified layout, for example, a graphic data system (GDS) II that reflects the OPC.

According to an embodiment, in operation S770, a semiconductor device that includes the integrated circuit is manufactured using the mask. Specifically, a semiconductor device that includes the integrated circuit is formed by performing various semiconductor processes on a semiconductor substrate such as a wafer using a plurality of masks. For example, a process using a mask can include a lithographic patterning process. By the patterning process, a desired pattern is formed on a semiconductor substrate or a material layer. The semiconductor processes include a deposition process, an etching process, an ion process, and a cleaning process. In addition, the semiconductor processes include a packaging process in which a semiconductor device is mounted on a PCB and sealed with a sealant, and includes test processes that test the semiconductor device or package.

Figure 22:
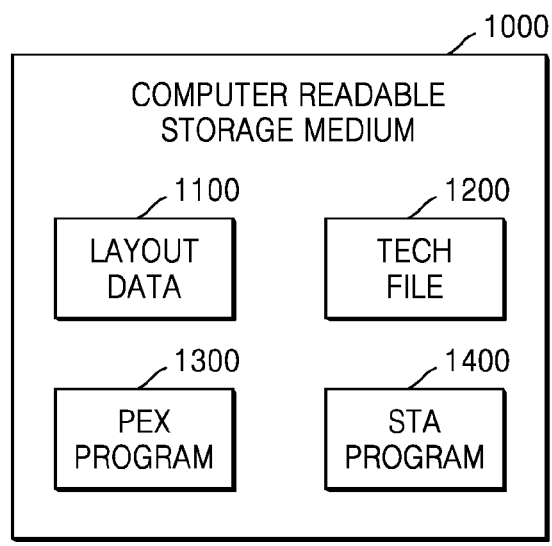
FIG. 22 illustrates a computer-readable storage medium according to an embodiment.

FIG. 22 illustrates a computer-readable storage medium 1000 according to an embodiment.

Referring to FIG. 22, according to an embodiment, the storage medium 1000 stores layout data 1100, a technology file 1200, a PEX program 1300, and an STA program 1400. The storage medium 1000 is a computer-readable storage medium, and includes a storage medium that is read by a computer while being used to provide instructions or data to the computer. For example, the computer-readable storage medium 1000 may be a magnetic or optical medium such as disk, tape, a CD-ROM, a DVD-ROM, a CD-R, a CD-RW, a DVD-R, or a DVD-RW, a volatile or nonvolatile memory such as RAM, ROM, or flash memory, a nonvolatile memory accessible through a USB interface, or a microelectromechanical system (MEMS). The computer-readable storage medium can be inserted into a computer, integrated into a computer, or connected with the computer through a communication medium such as a wireline or wireless network.

According to an embodiment, the layout data 1100 includes physical information about a layout generated by a P&R operation. For example, the layout data 1100 corresponds to the layout data 100 of FIG. 6. For example, the technology file 1200 corresponds to the technology file 200 of FIG. 6 or the technology file 200a or 200b of FIG. 8A or 8B.

According to an embodiment, the PEX program 1300 includes a plurality of instructions that perform a parasitic component extraction method according to embodiments. For example, the PEX program 1300 is used to perform operation S150 of FIG. 1, operation S230 of FIG. 5, or operation S300 of FIG. 6. The STA program 1400 includes a plurality of instructions that perform a timing analysis method according to embodiments. For example, the STA program 1400 is used to perform operation S170 of FIG. 1, operation S250 of FIG. 5, operation S400 of FIG. 14, operation S500 of FIG. 16, or operation S600 of FIG. 18.

While embodiments of the inventive concept has been particularly shown and described with reference to exemplary embodiments thereof, it will be understood that various changes in form and details may be made therein without departing from the spirit and scope of the following claims.

What is claimed is:

1. A computer-implemented method of designing an integrated circuit, the computer-implemented method comprising:

receiving layout data for the integrated circuit that includes a plurality of metal layers and a technology file that comprises corners of a parasitic component of each of the plurality of metal layers;

generating parasitic component data by performing a parasitic component extraction operation on corners of a parasitic component of a metal layer in a timing arc on a net of the integrated circuit, the parasitic component data comprising delay variation data of the timing arc due to a process variation of the metal layer, wherein the delay variation data comprises wire delay sensitivity coefficients, wherein generating the parasitic component data comprises:

calculating a delay difference by subtracting a nominal wire delay when the parasitic component of the metal layer is a nominal corner, from a corner wire delay when the parasitic component of the metal layer is the corner, and calculating the wire delay sensitivity coefficients from a ratio of the delay difference to the nominal wire delay; and generating timing analysis data by performing a timing analysis on the integrated circuit based on the parasitic component data, wherein the timing analysis data comprises a wire delay sensitivity for the timing arc based on the wire delay sensitivity coefficients.

2. The computer-implemented method of claim 1, wherein the delay variation data further comprises a random wire delay sensitivity coefficient.

3. The computer-implemented method of claim 1, wherein the timing arc comprises a first metal layer and a second metal layer, and when parasitic components of the first and second metal layers of the timing arc are shifted to a corner, generating the parasitic component data comprises:

generating a first wire delay sensitivity coefficient of the first metal layer, based on a first corner wire delay when a parasitic component of the first metal layer is a corner and a parasitic component of the second metal layer is a nominal corner, and based on a nominal wire delay when the parasitic components of the first and second metal layers are nominal corners; and generating a second wire delay sensitivity coefficient of the second metal layer, based on a second corner wire delay when the parasitic component of the second metal layer is a corner and the parasitic component of the first metal layer is a nominal corner, and based on the nominal wire delay when the parasitic components of the first and second metal layers are nominal corners.

4. The computer-implemented method of claim 3, wherein generating the first wire delay sensitivity coefficient comprises:

calculating a first delay difference by subtracting the nominal wire delay from the first corner wire delay; and calculating the first wire delay sensitivity coefficient from a ratio of the first delay difference to the nominal wire delay.

5. The computer-implemented method of claim 1, wherein generating the timing analysis data comprises:

calculating the wire delay sensitivity for the timing arc based on the wire delay sensitivity coefficients; and calculating a slack of a timing path comprising the tinning arc, by propagating the wire delay sensitivity through the timing path.

6. The computer-implemented method of claim 1, wherein the parasitic component data further comprises capacitance sensitivity coefficients of the net.

7. The computer-implemented method of claim 6, wherein when parasitic components of a metal layer of the timing arc are shifted to a corner, generating the parasitic component data comprises:

generating the capacitance sensitivity coefficients, based on a corner capacitance when the parasitic component of the metal layer is the corner, and based on a nominal capacitance for metal layers of the timing arc that correspond to a nominal corner.

8. The computer-implemented method of claim 6, wherein the net comprises a first metal layer and a second metal layer, and when parasitic components of the first and second metal layers of the net are shifted to a corner, generating the parasitic component data comprises:

generating a first capacitance sensitivity coefficient of the first metal layer, based on a first corner capacitance when a parasitic component of the first metal layer is a corner and a parasitic component of the second metal layer is a nominal corner, and based on a nominal capacitance when the parasitic components of the first and second metal layers are nominal corners; and generating a second capacitance sensitivity coefficient of the second metal layer, based on a second corner capacitance when the parasitic component of the second metal layer is a corner and the parasitic component of the first metal layer is a nominal corner, and based on the nominal capacitance when the parasitic components of the first and second metal layers are nominal corners.

9. The computer-implemented method of claim 8, wherein generating the first capacitance sensitivity coefficient comprises:

calculating a capacitance difference by subtracting the nominal capacitance from the first corner capacitance; and calculating the first capacitance sensitivity coefficient from a ratio of the capacitance difference to the nominal capacitance.

10. The computer-implemented method of claim 6, wherein generating the timing analysis data comprises:

calculating the wire delay sensitivity for the timing arc, based on the wire delay sensitivity coefficients;

calculating a cell delay sensitivity of a driving cell connected to the timing arc, based on the capacitance sensitivity coefficients;

calculating a cell/wire delay sensitivity by merging the wire delay sensitivity with the cell delay sensitivity; and calculating a slack of a timing path comprising the timing arc by propagating the cell/wire delay sensitivity through the timing path.

11. The computer-implemented method of claim 6, wherein the parasitic component data further comprises at least one of a random wire delay sensitivity obtained from the wire delay sensitivity coefficients and a random capacitance sensitivity obtained from the capacitance sensitivity coefficients.

12. The computer-implemented method of claim 11, wherein generating the timing analysis data comprises:

calculating the wire delay sensitivity for the timing arc, based on the wire delay sensitivity coefficients;

calculating a cell delay sensitivity of a driving cell connected to the timing arc, based on the capacitance sensitivity coefficients;

calculating a cell/wire delay sensitivity by merging the wire delay sensitivity with the cell delay sensitivity;

propagating the cell/wire delay sensitivity and a local random delay sensitivity through a timing path comprising the timing arc;

calculating a total delay sensitivity by merging the propagated local random delay sensitivity with the propagated cell/wire delay sensitivity; and calculating a slack of the timing path, wherein the local random delay sensitivity is obtained from the random wire delay sensitivity and the random capacitance sensitivity.

13. The computer-implemented method of claim 1, wherein the net corresponds to a plurality of timing arcs and each of the plurality of timing arcs comprises a plurality of metal layers, wherein the parasitic component data comprises delay variation data corresponding to each of the plurality of timing arcs and delay variation data corresponding to the net.

14. A method of manufacturing an integrated circuit, the method comprising:

generating parasitic component data by performing a parasitic component extraction operation on corners of parasitic components of a metal layer in a timing arc on a net of the integrated circuit using layout data for the integrated circuit and a technology file that includes corners of a parasitic component of each metal layer included in the integrated circuit, wherein the parasitic component data comprises delay variation data of the timing arc due to a process variation of the metal layer of the timing arc, wherein the delay variation data comprises wire delay sensitivity coefficients, wherein generating the parasitic component data comprises:

calculating a delay difference by subtracting a nominal wire delay when the parasitic component of the metal layer is a nominal corner, from a corner wire delay when the parasitic component of the metal is the corner; and calculating the wire delay sensitivity coefficients from a ratio of the delay difference to the nominal wire delay, generating timing analysis data by performing a timing analysis on the integrated circuit based on the parasitic component data, wherein the timing analysis data comprises a wire delay sensitivity for the timing arc based on the wire delay sensitivity coefficients; and manufacturing the integrated circuit based on the layout data and the timing analysis data.

15. The method of claim 14, wherein the parasitic component data further comprises capacitance sensitivity coefficients of the net.

16. The method of claim 15, wherein the parasitic component data further comprises at least one of a random wire delay sensitivity obtained from the wire delay sensitivity coefficients and a random capacitance sensitivity obtained from the capacitance sensitivity coefficients.

17. The method of claim 14, wherein manufacturing the integrated circuit comprises:

modifying the layout data based on the timing analysis data;

generating a mask according to the modified layout data; and manufacturing the integrated circuit using the generated mask.

18. A computing system for designing an integrated circuit, the computing system comprising:

a memory that stores procedures that design the integrated circuit; and a processor connected to the memory and that executes the procedures, wherein a net of the integrated circuit corresponds to a plurality of timing arcs and each of the plurality of timing arcs comprises a plurality of metal layers, wherein the procedures comprise:

a parasitic component extractor that generates parasitic component data by performing a parasitic component extraction operation on each corner of an i-th metal layer for each timing arc, the parasitic component data comprising a wire delay sensitivity coefficient when parasitic components of the i-th metal layer are shifted to a j-th corner, wherein i and j are natural numbers, wherein a wire delay sensitivity coefficient of the metal layer of the timing arc is calculated from a ratio of a delay difference to a nominal wire delay when the parasitic component of the i-th metal layer is a nominal corner, the delay difference being calculated by subtracting the nominal wire delay from a corner wire delay when the parasitic component of the i-th metal layer is the corner; and a timing analyzer that generates timing analysis data by performing a timing analysis on the integrated circuit, based on the parasitic component data, wherein the timing analysis data comprises a wire delay sensitivity for the timing arc based on the wire delay sensitivity coefficients.

19. The computing system of claim 18, wherein, when parasitic components of the i-th metal layer are shifted to the j-th corner, the parasitic component data further comprises at least one selected from capacitance sensitivity coefficients of the net, a random wire delay sensitivity obtained from wire delay sensitivity coefficients, and a random capacitance sensitivity obtained from the capacitance sensitivity coefficients.

* * * * *